US009035949B1

(12) United States Patent
Oberheu et al.

(10) Patent No.: US 9,035,949 B1
(45) Date of Patent: May 19, 2015

(54) VISUALLY REPRESENTING A COMPOSITE GRAPH OF IMAGE FUNCTIONS

(75) Inventors: Kent Oberheu, Berkeley, CA (US); Piotr Stanczyk, San Francisco, CA (US); Edward Hanway, Mill Valley, CA (US); Patrick Tubach, Novato, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 743 days.

(21) Appl. No.: 12/756,046

(22) Filed: Apr. 7, 2010

Related U.S. Application Data

(60) Provisional application No. 61/284,475, filed on Dec. 21, 2009.

(51) Int. Cl.
  *G06T 11/20* (2006.01)
(52) U.S. Cl.
  CPC .................................. *G06T 11/206* (2013.01)
(58) Field of Classification Search
  None
  See application file for complete search history.

(56) References Cited

U.S. PATENT DOCUMENTS

| | | | |
|---|---|---|---|
| 5,490,246 A * | 2/1996 | Brotsky et al. | 715/763 |
| 6,282,699 B1 * | 8/2001 | Zhang et al. | 717/109 |
| 6,298,474 B1 * | 10/2001 | Blowers et al. | 717/104 |
| 6,763,515 B1 * | 7/2004 | Vazquez et al. | 717/109 |
| 7,020,868 B2 * | 3/2006 | Debbins et al. | 717/108 |
| 7,145,562 B2 * | 12/2006 | Schechter et al. | 345/420 |
| 7,290,216 B1 * | 10/2007 | Kawahara et al. | 715/762 |
| 7,463,263 B2 * | 12/2008 | Gilboa | 345/440 |
| 8,397,176 B2 * | 3/2013 | Subramanian et al. | 715/809 |
| 2002/0032697 A1 * | 3/2002 | French et al. | 707/500.1 |
| 2002/0140707 A1 * | 10/2002 | Samra et al. | 345/619 |
| 2003/0218634 A1 * | 11/2003 | Kuchinsky et al. | 345/764 |
| 2004/0169688 A1 * | 9/2004 | Burdick et al. | 345/854 |
| 2004/0196299 A1 * | 10/2004 | Di Lelle et al. | 345/619 |
| 2005/0039176 A1 * | 2/2005 | Fournie | 717/156 |
| 2005/0256891 A1 * | 11/2005 | Voln | 707/101 |
| 2006/0048075 A1 * | 3/2006 | Kim | 715/840 |

(Continued)

OTHER PUBLICATIONS

Konstantinos et al., The Khoros Software Development Environment for Image and Signal Processing, May 1994, IEEE Transactions on Image Processing, vol. 3, No. 3, pp. 243-252.*

(Continued)

*Primary Examiner* — Aaron M Richer
*Assistant Examiner* — Anh-Tuan V Nguyen
(74) *Attorney, Agent, or Firm* — Kilpatrick Townsend & Stockton LLP

(57) ABSTRACT

Visually representing a composite graph of image functions includes providing a visual representation of a composite graph for an image, the visual representation including first items corresponding to respective image functions, and second items corresponding to containers for image functions, the image to be rendered by performing the image functions in an order defined by the composite graph. The user selects an expansion mode for presenting contents of a first container, each of the containers having a first expansion mode wherein the contents are displayed generally adjacent the visual representation, and a second expansion mode where the contents are displayed generally within the visual representation. A modified visual representation of the composite graph is provided in response to the input, wherein the modified visual representation maintains the order of the image functions defined by the composite graph and has the first container expanded according to the selected expansion mode.

20 Claims, 16 Drawing Sheets

(56) References Cited

U.S. PATENT DOCUMENTS

| | | | | |
|---|---|---|---|---|
| 2006/0259853 | A1* | 11/2006 | Zellweger et al. | 715/500.1 |
| 2006/0274070 | A1* | 12/2006 | Herman et al. | 345/474 |
| 2007/0016615 | A1* | 1/2007 | Mohan et al. | 707/104.1 |
| 2007/0035543 | A1* | 2/2007 | David et al. | 345/420 |
| 2007/0162953 | A1* | 7/2007 | Bolliger et al. | 725/142 |
| 2007/0198949 | A1* | 8/2007 | Rummel | 715/810 |
| 2008/0030504 | A1* | 2/2008 | Brunner et al. | 345/473 |
| 2009/0009520 | A1* | 1/2009 | Breton et al. | 345/473 |
| 2009/0289941 | A1* | 11/2009 | Davidson et al. | 345/427 |
| 2013/0125052 | A1* | 5/2013 | Baird | 715/810 |

OTHER PUBLICATIONS

Apple's SHAKE product (undated screenshot from product that was commercially available more than one year before the priority date of this patent application), downloaded from the internet at: http://4.bp.blogspot.com/_x9CqFLWJo1M/Sl lruGhkiPI/AAAAAAAABJc/032-pXXhevk/s1600-h/Screen+shot+2010-01-25+at+AM+04.08.32.png on Jun. 30, 2011, 1 page.

Audiovisual Panorama "The Foundry Nuke Starts Selling 5.2", Aug. 27, 2009, downloaded from the internet at: http://www.panoramaaudiovisual.com/en/2009/08/27/starts-selling-the-foundry-nuke-5-February/ on Jul. 1, 2011, 2 pages.

Big Blocks (Undated screenshot from product that was commercially available more than one year before the priority date of this patent application), 1 page.

Bragdon, "Code Bubbles: Rethinking the User Interface Paradigm of Integrated Development Environments", downloaded from the internet at: http://www.youtube.com/comment_servlet?all_comments&v=PsPX0nE1J0k on Apr. 7, 2010, 8 pages.

Bragdon, "Code Bubbles: Rethinking the User Interface Paradigm of Integrated Development Environments" , downloaded from the internet at: http://www.youtube.com/watch?v=PsPX0nElJ0k on Apr. 7, 2010, 2 pages.

Bragdon, "Code Bubbles: Rethinking the User Interface Paradigm of Integrated Development Environment, Bubbles Metaphor", downloaded from the internet at: http://www.cs.brown.edu/people/acb/codebubbles_details.htm on Apr. 7, 2010 2 pages.

Bragdon, "Code Bubbles: Rethinking the User Interface Paradigm of Integrated Development Environment, FAQ", downloaded from the internet at: http://www.cs.brown.edu/people/acb/codebubbles_faq.htm on Apr. 7, 2010 2 pages.

Bragdon, "Code Bubbles: Rethinking the User Interface Paradigm of Integrated Development Environment, Overview", downloaded from the internet at: http://www.cs.brown.edu/people/acb/codebubbles_site.htm on Apr. 7, 2010 2 pages.

Johnson, "DJX Blog: Layering Shaders with MentalRay", Feb. 1, 2008, downloaded from the internet at : http://wwww.djx.com.au/blog/2008/02/01/layering-shaders-with-mentalray/ on Jul. 1, 2011, 9 pages.

LEGO Mindstorms Nxt (undated screenshot from product that was commercially available more than one year before the priority date of this patent application), 1 page.

LEGO software (undated screenshot from product that was commercially available more than one year before the priority date of this patent application), 1 page.

Los Angeles Final Cut Pro User Group (undated screenshot from product that was commercially available more than one year before the priority date of this patent application), downloaded from the internet at: http://www.lafcpug.org/images_basic_chroma_sample/ShakeScript2.jpg on Jun. 30, 2011, 1 page.

Open Movie Editor (undated screenshot from product that was commercially available more than one year before the priority date of this patent application), downloaded from the internet at: http://www.openmovieeditor.org/images/node_filters_shadow.png on Jun. 30, 2011, 1 page.

RMoX 0.1.5 Windowing System (undated screenshot from product that was commercially available more than one year before the priority date of this patent application), 1 page.

Schultz, "Navigating with the Address Bar in Windows Vista's Windows Explorer", downloaded from the internet at: http://articies.techrepublic.com.com/5100-10878_11-6116684.html on May 26, 2010, 6 pages.

The Foundry Visionmongers Ltd. "The Foundry at NAB 2011", Apr. 12, 2011, downloaded from the internet at: http://www.thefoundry.co.uk/articles/2011/04/12/240/the-foundry-at-nab-2011/#NUKE on Jul. 1, 2011, 5 pages.

.Theprodukkt ".theprodukkt will make you happy" downloaded from the internet at: http://www.theprodukkt.com/theprodukkt on Oct. 14, 2009, 3 pages.

Wikipedia, "URL bar", downloaded from the internet at: http://web.archive.org/web/20080122161603/http:/en.wikipedia.org/wiki/Address_bar on Jun. 22, 2011, last modified on Dec. 24, 2007, 2 pages.

* cited by examiner

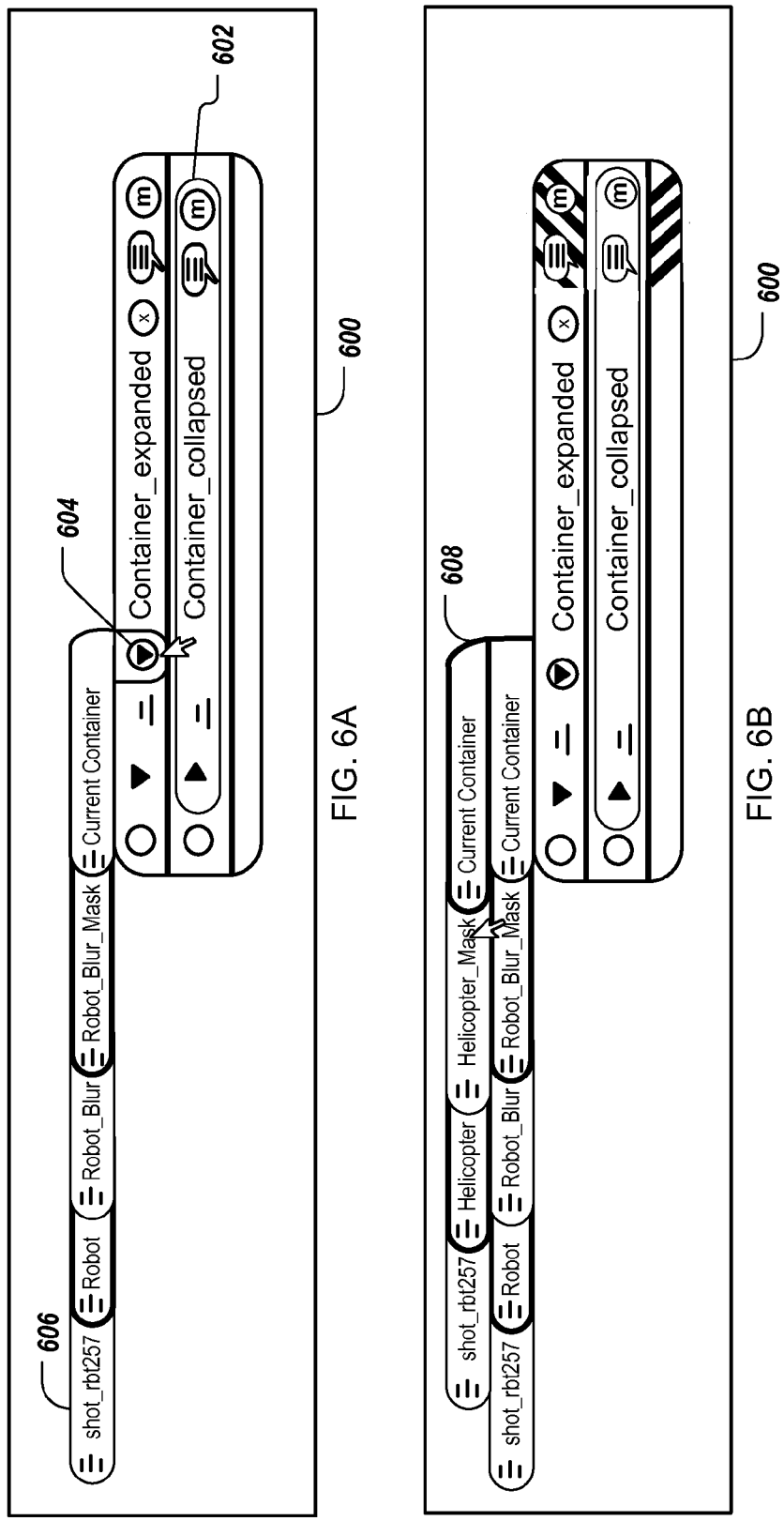

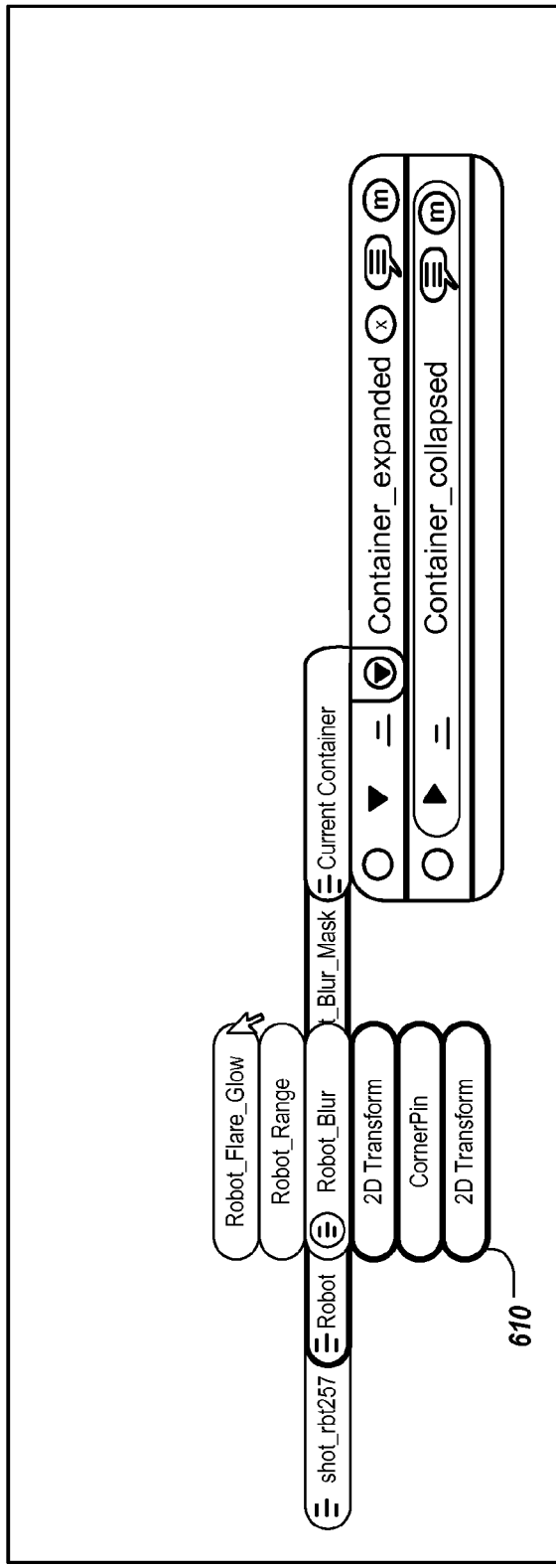
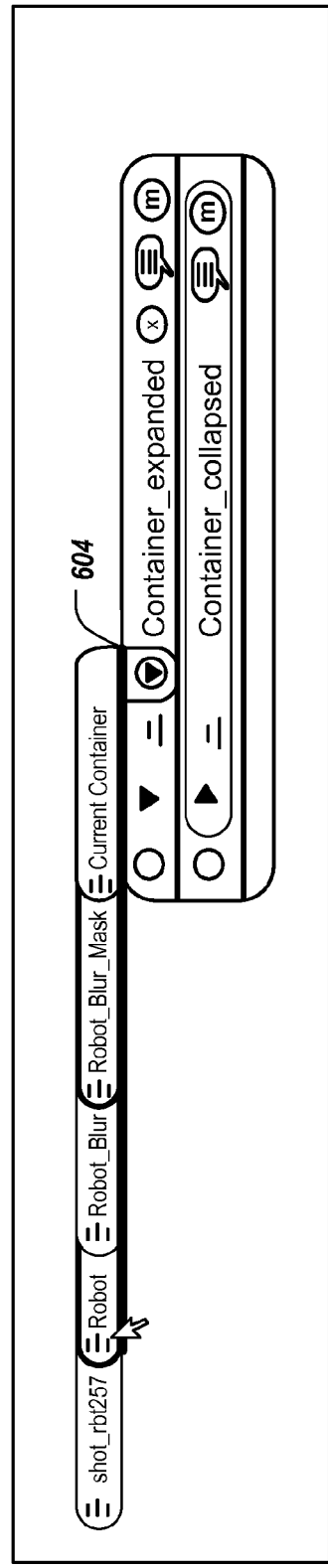
FIG. 6C
FIG. 6D

VISUALLY REPRESENTING A COMPOSITE GRAPH OF IMAGE FUNCTIONS

CROSS-REFERENCE TO RELATED APPLICATIONS

This application claims the benefit of U.S. Provisional Application Ser. No. 61/284,475, filed Dec. 21, 2009, the entire contents of which are incorporated herein by reference.

TECHNICAL FIELD

This document relates to composite graphs.

BACKGROUND

User interfaces for performing image compositing may require users to work with a visual presentation of a graph of composition nodes of which only a portion is typically able to be shown on a display device at any given time. Users spend a great deal of time navigating graphs in order to find specific image processing nodes which results in lost time; also, in these systems the context is the only way for the user understand where they are in the graph.

SUMMARY

The invention relates to composite graphs.

In a first aspect, a computer-implemented method for visually representing a composite graph of image functions includes providing, in a computer system, a visual representation of a composite graph for an image, the visual representation including first items corresponding to respective image functions, and second items corresponding to containers for image functions, wherein the image is to be rendered by performing the image functions in an order defined by the composite graph. The method includes receiving, in the computer system, an input made by the user in selecting an expansion mode for presenting contents of a first container, each of the containers having a first expansion mode wherein the contents are displayed generally adjacent the visual representation, and a second expansion mode where the contents are displayed generally within the visual representation. The method includes providing, in the computer system, a modified visual representation of the composite graph in response to the input, wherein the modified visual representation maintains the order of the image functions defined by the composite graph and has the first container expanded according to the selected expansion mode.

Implementations can include any or all of the following features. The modified visual representation further includes, simultaneously with the first container that is expanded according to the selected expansion mode, a second container expanded using another expansion mode of the containers than the selected expansion mode. The first container is expanded using the first expansion mode and has included therein the second container which is expanded using the second expansion mode. The first expansion mode involves: the visual representation has the first container and at least one other first or second item organized in a generally vertical list in the visual representation, the expanded first container is horizontally offset to a location on one side of the vertical list and visually connected to the first container in the vertical list, and the expanded first container includes at least one first or second item visible at the location. The second expansion mode involves: the visual representation has the first container and at least one other first or second item organized in a generally vertical list in the visual representation, the expanded first container is included in the vertical list starting where the first container is located, and the other first or second item is displaced vertically in the vertical list to accommodate the expanded first container, and the expanded first container includes at least one first or second item visible in the vertical list. The visual representation includes second items corresponding to multiple groups of containers, some of which are nested within each other such that the visual representation comprises a hierarchy, the method further comprising: receiving another input that requests at least two views into the hierarchy; and generating another modified visual representation of the composite graph in response to the other input, the other modified visual representation providing the two views. The two views focus on respective containers located in topologically separate areas of the hierarchy. At least one of the views is provided by tearing off the corresponding containers from an initial area of the visual representation and relocating them adjacent the containers of the other one of the views, wherein the other modified visual representation maintains the order of the image functions defined by the composite graph among the corresponding containers, and wherein the views are visible after the user closes a remainder of the visual representation from which the corresponding containers depend. The method further includes receiving a user modification of a container in at least one of the views while the modified visual representation is displayed; and modifying the composite graph according to the user modification. The user creates the composite graph by choosing the order and assembling the containers so that the composite graph reflects the order, the assembly being done by making one or more inputs in the computer system causing each of the containers to be placed in respective selected locations.

In a second aspect, a computer program product tangibly embodied in a computer-readable storage medium includes instructions that when executed by a processor perform a method for visually representing a composite graph of image functions. The method includes providing, in a computer system, a visual representation of a composite graph for an image, the visual representation including first items corresponding to respective image functions, and second items corresponding to containers for image functions, wherein the image is to be rendered by performing the image functions in an order defined by the composite graph. The method includes receiving, in the computer system, an input made by the user in selecting an expansion mode for presenting contents of a first container, each of the containers having a first expansion mode wherein the contents are displayed generally adjacent the visual representation, and a second expansion mode where the contents are displayed generally within the visual representation. The method includes providing, in the computer system, a modified visual representation of the composite graph in response to the input, wherein the modified visual representation maintains the order of the image functions defined by the composite graph and has the first container expanded according to the selected expansion mode.

In a third aspect, a computer system includes an image processing module tangibly embodied in a computer-readable storage medium, the image processing module configured to render an image by performing image functions in an order defined by a composite graph for the image. The system includes a graph management module tangibly embodied in a computer-readable storage medium, the graph management module configured for: (i) a user to generate the composite graph by defining the order of the image functions, and for (ii)

generating a visual representation of the composite graph that includes items corresponding to containers for the image functions, each of the containers having a first expansion mode wherein contents are displayed generally adjacent the visual representation, and a second expansion mode where the contents are displayed generally within the visual representation. The system includes a display device for presenting the visual representation and, after receiving a user input selecting one of the first and second expansion modes for presenting contents of a first container, presenting a modified visual representation of the composite graph in response to the user input, the modified visual representation maintaining the order of the image functions defined by the composite graph and having the first container expanded according to the selected expansion mode.

In a fourth aspect, a computer program product is tangibly embodied in a computer-readable storage medium, the computer program product including instructions that, when executed, generate on a display device a graphical user interface for visually representing a composite graph of image functions. The graphical user interface includes a visual representation of a composite graph for an image. The graphical user interface includes first items included in the visual representation, the first items corresponding to respective image functions, wherein the image is to be rendered by performing the image functions in an order defined by the composite graph. The graphical user interface includes second items included in the visual representation, each of the second items corresponding to a container for at least some of the image functions, each of the containers having a first expansion mode wherein the contents are displayed generally adjacent the visual representation, and a second expansion mode where the contents are displayed generally within the visual representation. After receiving an input made by a user in selecting one of the first and second expansion modes for presenting contents of a first container, the graphical user interface generates a modified visual representation of the composite graph in response to the input, the modified visual representation maintaining the order of the image functions defined by the composite graph and has the first container expanded according to the selected expansion mode.

Implementations can include any or all of the following features. The visual representation includes second items corresponding to multiple groups of containers, some of which are nested within each other such that the visual representation comprises a hierarchy, wherein another input that requests at least two views into the hierarchy is received, wherein another modified visual representation of the composite graph is generated in response to the other input, the other modified visual representation providing the two views, wherein the two views focus on respective containers located in topologically separate areas of the hierarchy, wherein at least one of the views is provided by tearing off the corresponding containers from an initial area of the visual representation and relocating them adjacent the containers of the other one of the views, wherein the other modified visual representation maintains the order of the image functions defined by the composite graph among the corresponding containers, and wherein the views are visible after the user closes a remainder of the visual representation from which the corresponding containers depend. The graphical user interface further comprises an input function for the user to cause each of the containers to be placed in a selected location so that the composite graph reflects the order. The input function comprises at least one of: (i) a drag-and-drop function, the assembly being done by dragging each of the containers and dropping the dragged container in the selected location; and (ii) a keyboard shortcut. The graphical user interface further comprises: a project panel that lists each composite that is involved in a project, including the composite graph, and provides access to sources for the project. The graphical user interface further comprises: a composite map panel providing a single location for cross referencing multiple types of data, overlaid on a map of a structure of the composite graph. The graphical user interface further comprises an attribute editor panel for the user to work on attributes of any of the first and second items. The graphical user interface further comprises: a timeline panel providing access to timing parameters for nodes and objects in the composite graph. The graphical user interface further comprises an asset panel providing the user access to a pipeline for bringing rendered images and elements into a project that includes the composite graph.

Implementations can provide any or all of the following advantages. An artist can quickly change the context in which the artist is viewing and working on a portion of a graph without destroying the current selection. A hybrid outliner, columnar, and windowing approach to graph representation can enable quick access to sections of the graph regardless of location in the topology. Flexibility of navigation can make it easy for the user to expand his or her graph.

The details of one or more implementations are set forth in the accompanying drawings and the description below. Other features and advantages will be apparent from the description and drawings, and from the claims.

DESCRIPTION OF DRAWINGS

FIGS. 6A-D show examples of revealing the path of an isolated container.

Like reference symbols in the various drawings indicate like elements.

DETAILED DESCRIPTION

Figure 1:
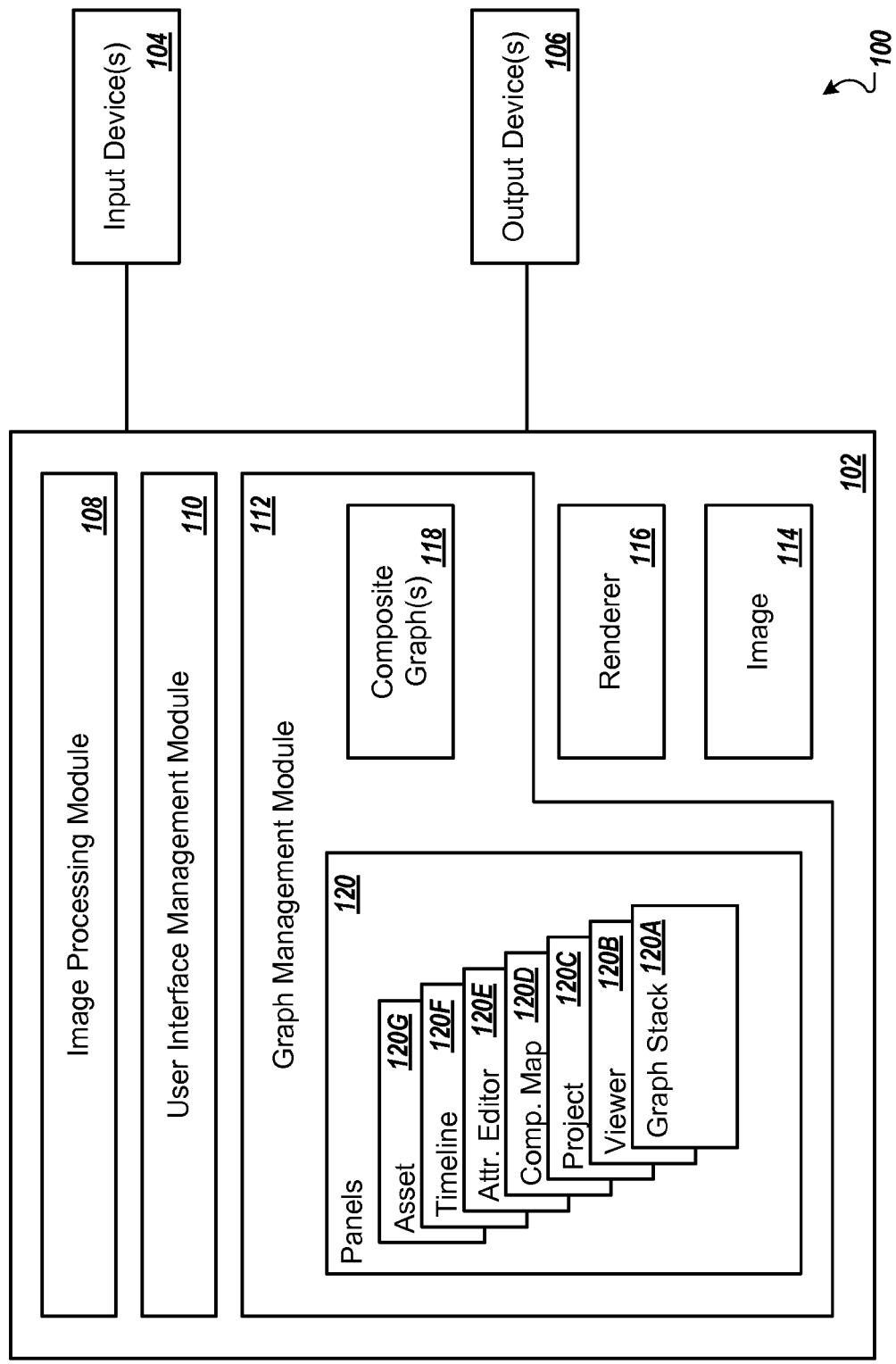
FIG. 1 shows an example system that can be used for visually representing a composite graph of image functions.

FIG. 1 shows an example system 100 that can be used for visually representing a composite graph of image functions.

In some implementations, the system 100 can be implemented using a computer device such as a server computer, a work terminal, a personal computer or any kind of processor-based device that processes images. In examples below, it will be described that image processing functions can be structured in a composite graph to define the order of operations to perform in rendering an image. For example, the image processing functions can be visualized as a composite graph of items representing image functions, or containers including items, and a user can view and/or manipulate the composite graph in one or more ways.

Here, the system 100 includes a processing unit 102, for example a computer device, and input device(s) 104 and output device(s) 106. In some implementations, the user interacts with the computer device using a mouse, keyboard, track ball or other input device, and can view visual outputs on one or more display devices. The system 100 can be connected one or more networks for purposes of exchanging information or data, and/or to share processing resources.

The system 100 includes an image processing module 108 that interacts with a user interface management module 110 and a graph management module 112. In some implementations, the image processing module 108 controls the graph management module 112 to generate outputs (e.g., panels for display), and controls the user interface management module 110 to display the panel(s) on the output device 106. For example, the displayed output can allow a user to define a composite graph for processing an image 114, such as one frame of an animation. The image 114 can be rendered by a renderer 116, for example to store the rendered image in the system 100 or elsewhere, and/or to display the rendered image on the output device 106 or elsewhere. In some implementations, the image 114 is rendered as part of an animation and such rendered images can be assembled in order and projected as part of a video or a motion picture.

The graph management module 112 here includes composite graph(s) 118. In some implementations, the graph 118 defines a structure of image functions that are to be performed in processing the image 114. For example, image functions can be organized in a linear order and processing can begin with applying the function that is at one end of the order and can then proceed through each listed function until the function at that is at the other end has been performed. In some implementations, the ordered functions can be considered a stack and the processing can then go from the bottom function to the top function. Other structures for organizing and/or processing the functions can be used.

The graph management module 112 allows the user to create, organize, manage, modify and use the composite graph(s) 118. For this or other purposes, the graph management module 112 can generate one or more panels 120 that can guide the user's work and help visualize the composite graph(s) 118, or at least relevant portions of it. Each or all of the panels 120 can be displayed in a graphical user interface on the output device(s) 106 by the user interface management module 110. Examples of the panels that can be generated and displayed will now be described.

A graph stack panel 120A can provide a visualization of the image processing structure in a composite. In some implementations, the graph stack panel 120A helps the user create composites by providing an interface to snap image processing functions together for producing the image.

A viewer panel 120B can show a rendered composite with which the artist is currently interacting. In some implementations, the viewer panel 120B can be used to isolate a portion of the graph. For example, the user can, if so desired, isolate a portion of the graph to show only a part of an extensive composite that is too large to be meaningfully displayed on a screen, or too large for the user to overview in its entirety.

A project panel 120C can allow the artist (i.e., the user) to interact with and manage contents of their project. In some implementations, the project panel 120C lists composites that are included in the project, and can provide access to the sources that provide content into the project. As another example, the project panel 120C can allow the artist to maintain notes about the project, and/or handle a rendering queue for the artist's work.

A composite map panel 120D can provide a single location for the user to cross reference multiple types of data. In some implementations, the composite map panel 120D can overlay such data on a "Map" of a given composite's structure. For example, by centralizing the display of data into a single location, the artist can quickly see areas of a composite with indication of one or more of the following: render progress, render times, cache status, locations of clones, non-image data flow, etc. As another example, the artist can use the map as a navigation tool to quickly populate other panels with portions of the graph. In some implementations, the development for these types of data can be centralized and built up over time.

An attribute editor panel 120E can serve as a shelf where the artist can park attribute editors for different nodes in the GraphStack. In some implementations, this provides a central facility to work on multiple objects at once, and this allows the user to quickly edit multiple objects side-by-side and/or fluidly control their respective composite(s). For example, planned flexibility can here allow the artist to create a layout of specific attributes they wish to control in a composite, and save the layout as a remote control. An advantage of such an approach can be the speed with which disparate portions of a composite can be edited.

A timeline panel 120F can provide access to timing parameters for nodes and objects in a composite. In some implementations, the timeline panel 120F includes the ability for the user to keyframe parameters of objects as well as to trim objects in time.

An asset panel 120G can provide the user access to the pipeline for bringing rendered images and elements into a project. In some implementations, the asset panel 120G can have a direct connection to one or more libraries, for example a linear algebra software library, and/or to a pipeline. For example, such connection(s) can bypass one or more inputs/outputs that are specific to the file system, such as "Open" and "Save" dialogs.

Figure 2A:
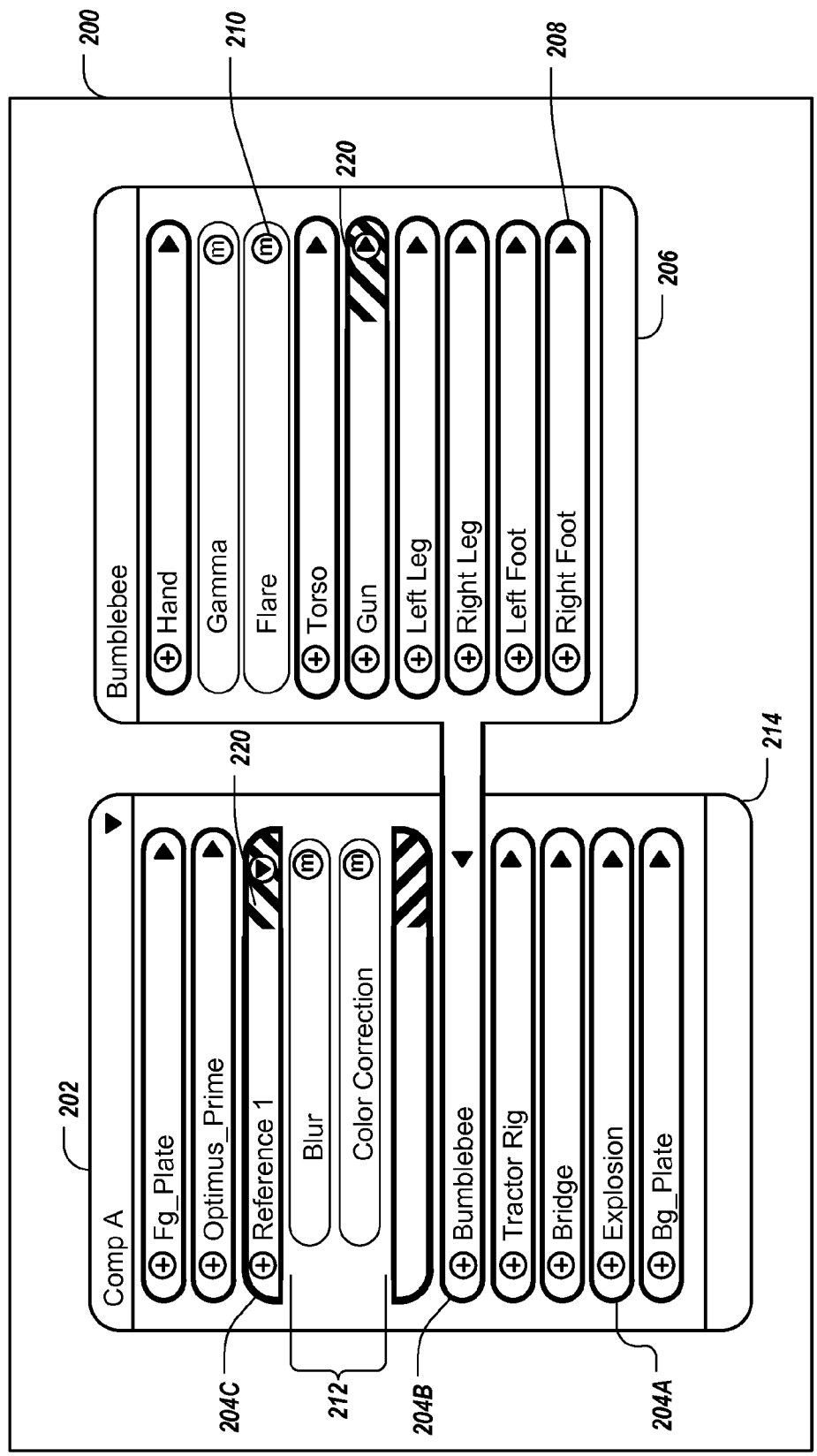
FIGS. 2A-B show examples of expansion modes.
Figure 2B:
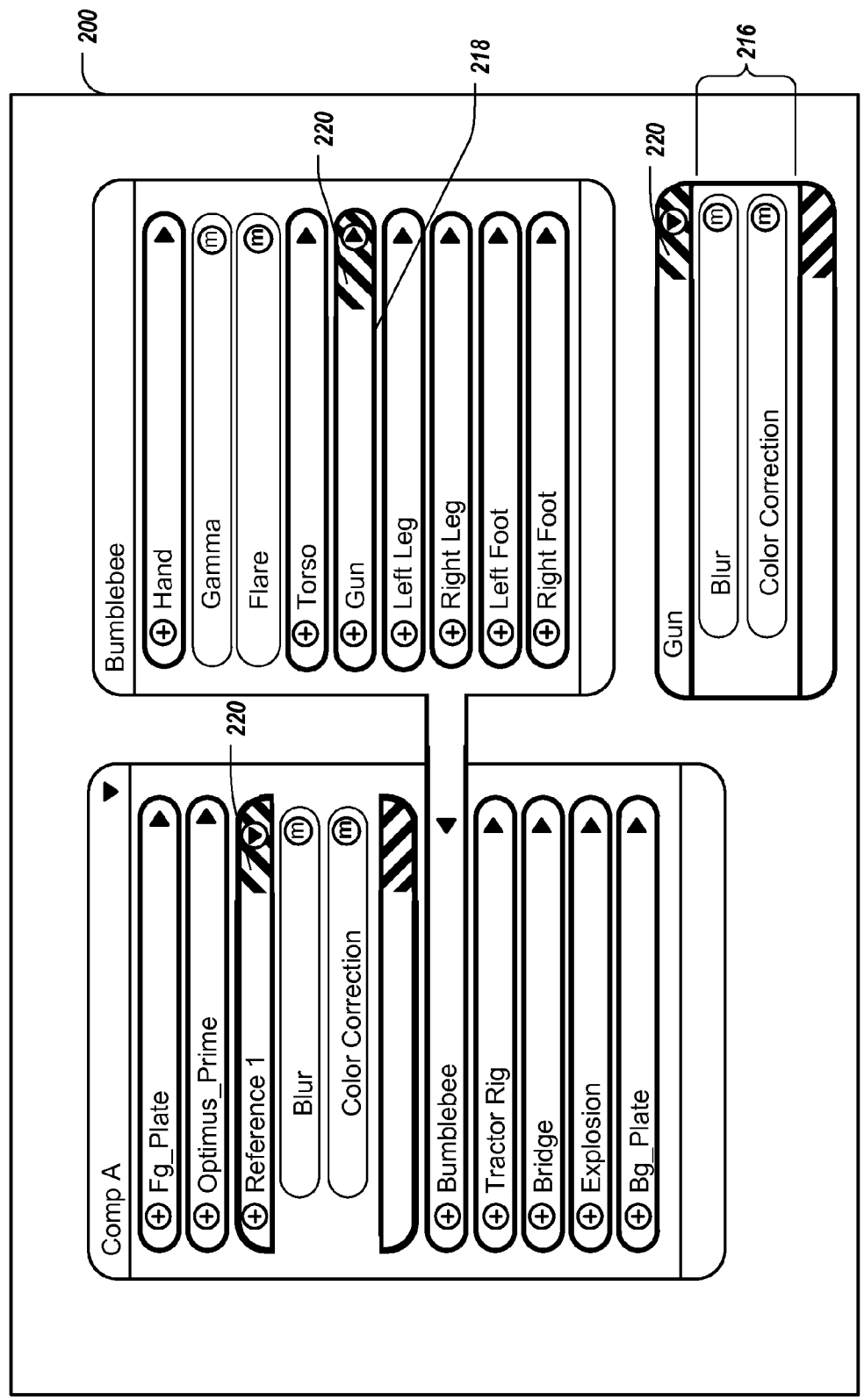

FIGS. 2A-B show examples of expansion modes. In a panel 200, a container 200 called "CompA" (a short term for "Composite A") is currently shown. The container 202 includes a number of items 204 that can be either image functions or another container.

In some implementations, building up a composite graph starts with a layer-based or outliner approach to compositing sources with one another. For example, stacking source containers atop one another composites them together. The stacking principle can rely on a rule such as: Bottom=Background, and Top=Foreground. That is, the bottommost item in any container or graph is to be performed first and corresponds to the background of the image. The topmost item, in contrast, is to be performed after the other function(s) and corresponds to the foreground of the image.

Some or all of the following can apply to all containers:
  Containers serve to hold built-in nodes with a predictable wiring scheme to enable compositing to happen.

The top level of a composite is named a Comp Container. There can be multiple composites in a single higher-level structure, for example a project.

Containers have a Composite Mode to composite the contents with what is below them in the stack.

Containers have a mask which is applied to the contents of the container prior to the Composite mode.

Containers can have an arbitrary number of contents stacked inside them which are evaluated in order from the bottom to the top of the contents.

Some or all of the following can apply to all functions:

Functions can only exist inside of another container.

Functions operate on all objects below them in the stack.

Functions have no composite mode.

Functions can have masks associated with them.

The mask on a function can be applied before or after the function.

Here, the items 204 include an "Explosion" item 204A, a "Bumblebee" item 204B and a "Reference 1" item 204C, among others. For example, the "Explosion" item 204A can be a container that includes one or more image functions to be applied when generating an explosion on the image. The "Explosion" item 204A is currently in a closed state inside the container 202, so the panel 200 does not currently show any image function(s) and/or container(s) that may be inside the item 204A.

In contrast to the item 204A which is in a closed state, the "Bumblebee" item 204B and "Reference 1" item 204C are both currently in expanded states. For example, the item 204B has been opened in what is here referred to as a columnar expansion mode, and the state of the item 204C is here referred to as an outline expansion mode.

The columnar expansion mode corresponds to a specific way of visualizing the contents of the item 204B. Here, an expanded container 206 corresponds to the "Bumblebee" item 204B and shows the contents thereof. The expanded container 206 can include one or more containers, for example a "Right Foot" container 208, and/or it can contain one or more image functions, for example a "Flare" image function 210. For example, the "Right Foot" container 208 can include one or more image functions that when executed on the image 114 generates the appearance of a right foot on the bumblebee, and the image function(s) can be repeated a number of times corresponding to the number of right feet that the animated bumblebee has (e.g., three). Similarly, the "Flare" image function 210 when executed can generate a flare effect on the image 114, such as on the portions of the bumblebee that have been visualized by the image functions performed so far.

Here, the expanded container 206 is seen to be displayed next to the container 202, because the expanded container 206 was generated by expanding the "Bumblebee" item 204B which is a container included in the container 202. Particularly, the expanded container 206 is visually connected to the item 204B to indicate the relationship. Also, the expanded container 206 can be located in relation to the container 202, for example such that they have their upper edges aligned (as here), or bottom edges aligned, or such that the expanded container 206 is centered on the item 204B or on the container 202, to name just a few examples.

Thus, in the columnar expansion mode the contents of the item 204B are here shown relatively close to the entire container 202, which is the context in which the item 204B occurs. This can help the user understand the nature of the image functions in the item 204B and to put them in proper perspective. In some implementations, the expanded container 206 can appear on the other side of, or in some other way near, the item 204B and/or the container 202.

In contrast to the columnar expansion mode, the "Reference 1" item 204C is expanded in the outline expansion mode. Here, the item 204C has contents 212 that are displayed below the header of the item 204C, in a vertical direction generally downward in the visual representation of the composite graph. The contents 212 here include "Color Correction" and "Blur" image functions, whose names reflect their respective functions when executed. The contents 212 are offset horizontally to indicate that they are not located at the same level as the items 204B. Also, the order of the "Color Correction" and "Blur" image functions in the contents 212 indicates the order in which the functions will be performed (e.g., by starting at the bottom the "Color Correction" function will be performed before the "Blur" function).

Here, the contents 212 are seen to be displayed generally within the container 202. This is in contrast to, for example, the expanded container 206 which was displayed outside the container 202. Some or all of the other items 204 can be displaced to accommodate the contents 212. For example, the items 204B, 204C and others are here moved downward in the container 202. Displaying the contents 212 in the outline expansion mode can help the user understand the contents' role and position in the overall sequence of the composite graph. That is, the user sees the "Color Correction" and "Blur" image functions in a place that indicates where in the overall "CompA" process they will be performed. The panel 200 provides drag-and-drop functionality, so the user can drag any of the items from one location and drop it at another location, to modify the order that image functions will be performed. In some implementations, one or more other input functions can be used to arrange the items in a selected order.

The two expansion modes can apply to essentially every container. Here, an arrow symbol 214 can be used for choosing the expansion mode. For example, on any of the items in the container 202 or in the expanded container 206 the user can "tug" the arrow symbol 214 (e.g., using a mouse or other pointing device) in a horizontal direction to expand the corresponding item using the columnar expansion mode. For example, in the item 204B, which is currently expanded using the columnar expansion mode, the symbol 214 is currently shown in an opposite direction, for the option of tugging the symbol 214 in the opposite direction to again collapse the expanded container 206 into the item 204B. As another example, the user can tug the arrow symbol 214 in a vertical direction on any of the items in the container 202 or in the expanded container 206 to expand the corresponding item using the outline expansion mode. If the arrow symbol 214 is tugged (or otherwise activated), corresponding to one of the expansion modes, on an item that is currently expanded using the other expansion mode, then the item can be changed from the current expansion mode directly into the new expansion mode without being placed in a collapsed state in between. Other input controls for choosing between expansion modes can be used.

The user can "tear" off one or more containers from their current position in the composite graph and place it or them at one or more other locations. This is useful in that it can let the user bring disparate portions of the composite graph together for convenient access. In other words, views of different graph portions can be generated, in arbitrary relation to each other, regardless of where in the topology of the composite graph the portions are located. In some implementations, the user can drag the arrow symbol 214 on any of the items in the container 202, or in the expanded container 206 to a blank space, to open that selected branch in isolation. For example, as illustrated in FIG. 2B, a "Gun" window 216 can be displayed after such a dragging. That is, the expanded container 206 here includes a "Gun" item 218 and the user can drag its corresponding arrow symbol 214 to an arbitrary location to trigger display of the window 216.

In some implementations, one or more keyboard shortcuts can be used to manage items and containers. For example, a keyboard shortcut of one or more keystrokes can be used to place a selected container at a chosen location in the graph. As another example, a keyboard shortcut can be used to select the expansion mode for a selected container.

After the window 216 is opened, the user can close, relocate or otherwise manipulate some or all of the remainder of the container 202 and/or the expanded container 206, without affecting the window 216 in its present location. This can allow the user to remove all composite graph portions that are not immediately relevant to the task(s) that the user is about to perform. Moreover, the order of image functions in the container 202 is not affected by the dragging. For example, the expanded container 206, which shows the contents of the item 204B, still has the "Gun" item 218 in the same place as before the window 216 was opened. Therefore, the image function(s) corresponding to the "Gun" item 218 will be performed at the same place in the overall order of functions as before. On the other hand, if the user manipulates the window 216 in certain ways, for example to add or delete an image function, or to reorganize the image functions that are currently therein, then the order of those functions is modified in the overall composite graph. The window 216 and the "Gun" item 218 in the expanded container 206 both have a proxy indicator 220 to indicate that the container is a proxy and is used in more than one location of the composite graph.

A workspace can provide visualization and editing of graph stacks. In some implementations, a workspace can be implemented as a desktop feature that lets users view their graph as they desire. The workspace can have scroll bars when necessary to navigate the graph. The workflow of the graph stack and multiple panels can enable the user to work in a manner which requires less focus on navigation by panning. For example, zooming in or out of the desktop may be unnecessary. In some implementations, the interface is generated in a fixed resolution. Containers and widgets in the graph stack can be collapsed and expanded for the user to enable a comparative workflow. In some implementations, a workspace contains at most one expanded view of each container. If there are multiple workspaces, for example organized using separate tabs in a graphical user interface, then a container can be open in more than one, or in all, of the workspaces.

Figure 3:
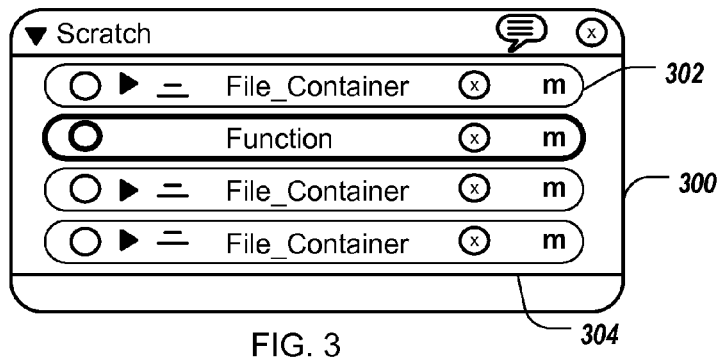
FIG. 3 shows an example of image functions in a scratch area of a graphical user interface.

FIG. 3 shows an example of image functions in a scratch area 300 of a graphical user interface. Every container or function in a graph stack is a location in the graph. The initial state of a container or function isolated in the graph stack is referred to as a window mode. This is a starting point for performing work on a branch of the graph. When containers are isolated, they represent a "window" which can reveal descendants from their vantage point in the graph. In some implementations, containers and functions are defined as follows:

Containers have contents (i.e., one or more other items), and functions do not.
Containers can be opened (e.g., to visualize the other item(s)), and functions cannot.

In some implementations, the default state of a container in the graph stack is that the container is open with its first level of contents revealed. If a container has no contents, it is closed by default. A function as an isolated element in the graph stack workspace appears similar to a container that has no contents. For example, both functions and containers can be represented by the basic "pill" shape of a node.

In operation, the artist can in some implementations drag or otherwise move an element from a project panel into a graph stack workspace. For example, the artist here has dragged a function item 302 into the scratch area 300. The item is then placed in the graph stack workspace in its default state. Here, the function item 302 is placed at the user's selected point among container items 304. If the artist drags the node into a container, an insertion point indicates where the item will be placed in the stack.

Figure 4:
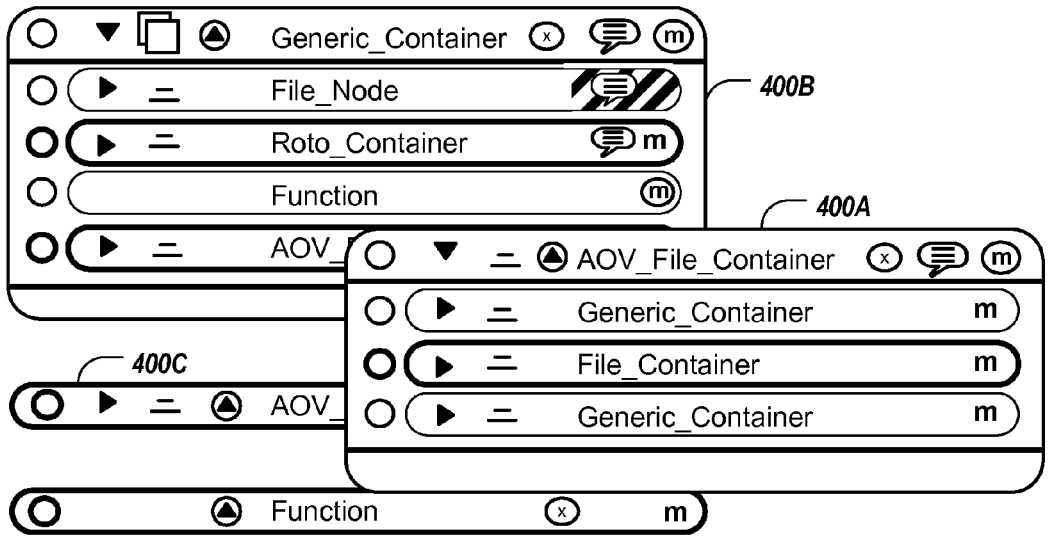
FIG. 4 shows an example of containers with image functions.

FIG. 4 shows an example of containers with image functions. In some implementations, windows in the graphical user interface will have a Z index in the graph stack workspace. For example, windows can be allowed to overlap one another. Selection of a window will bring it and any attached children (e.g., from outline mode or column mode) to the foreground. In some implementations, there is no grid in the workspace and windows are allowed to be moved freely about the workspace without snapping to one another. For example, a container 400A is here shown overlapping an expanded container 400B and a collapsed container 400C.

In some implementations, an expanded container in window mode has the primary elements of a header, contents and a footer. The header is located at the top of the open container and is represented as a horizontal bar. The header can be comprised of indicators and controls for the container. The top corners can be rounded with the bottom corners squared off. The rounding of the corners can be the same radius as the collapsed container when represented in the pill shape, e.g., 10 pixels. The contents are represented in the open area between the header and the footer. The footer is represented in the bottom bar of the open container. The bottom right corner can serve as a drag handle to resize the width of the container. In some implementations, the container shows the drag handle when the user places the cursor over the footer.

When the container is collapsed, only the icons in the header may remain visible. The collapsed container can look like a single pill shape on the graph stack workspace, with the same contents as the header when open.

Figure 5:
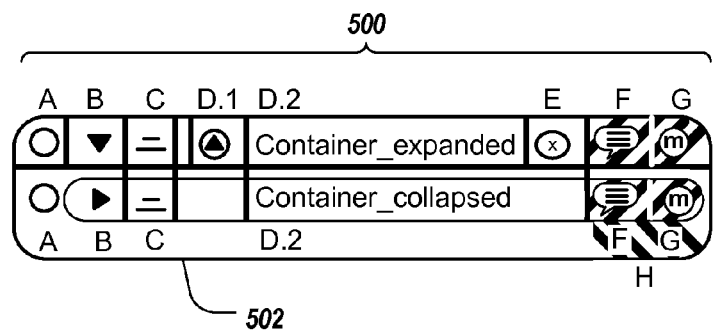
FIG. 5 shows an example of information in a container header.

FIG. 5 shows an example of information 500 in a container header 502. An Active Toggle 502A controls the active/inactive state of the node or container.

A Disclosure Toggle 502B opens the container to reveal its contents. In some implementations, there are 3 ways that the Disclosure Toggle 502B can expand a container: an outline mode, a columnar mode that expands horizontally in a separate column, and a window mode. The user can click the Disclosure Toggle 502B to expand the item using the last method the user interacted with. If the container is already expanded, the Disclosure Toggle 502B collapses the container back to the collapsed representation.

In some implementations, the user can tug the Disclosure Toggle 502B to the right to expand to the right in a column. The user can tug the Disclosure Toggle 502B downwards to expand in outline form. For example, a tug can be the equivalent of a short drag, a delta offset from the mousedown position, such as of 40 pixels. This method can be evaluated against a "click" and how either event is processed.

In some implementations, the user can drag the Disclosure Toggle 502B to a blank area of the workspace to open this container in its own window.

Subsequent clicks on the disclosure toggles of other containers performs the last action for disclosure which the artist used. For example, this can allow the artist to quickly expand items in the same manner as desired.

A Composite Mode control 502C is a pulldown/toggle hybrid control which sits near the left edge of the widget. The Composite Mode control 502C can provide a pulldown menu which lets the user quickly see what is the current composite mode of a container and edit it in the graph stack. The menu can have the previous state of the composite mode at the top of the list before the standard list of composite modes. For example, this can enable the user to quickly return to the previous composite mode. As another example, Alt+Click can be used to enable this functionality. Icons can appear on the left of the pulldown menu with the title of the composite mode on the right. Frequently used composite modes can have a unique icon for the composite mode. Less frequently used modes can have a more formulaic representation.

A Path reveal button 502D.1 reveals the path to the container or function and allows the user to select a parent to open in the graph stack workspace. Examples involving the Path reveal button 502D.1 will be described below with reference to FIGS. 6A-C.

A Name 502D.2 is the name of the node or container and may be assignable by the user. A close button 502E is used for closing. In some implementations, clicking this button closes the object from the current graph stack workspace without deleting the container. This button may be active only when the container or node is in "window" mode, i.e. when it is isolated in the workspace of the graph stack. An Indicator Field 502F shows information about a node or container. The type of information revealed can be user assignable for the current graph stack workspace.

A Mask Disclosure button 502.G can function as a hybrid of an indicator and a button. For example, it can indicates whether the mask has contents and/or if it is being used. As another example, it can expand the mask container. In some implementations, an "m" icon on the right hand edge of the container controls disclosure of a mask for a container or function. Additionally, the icon can allow the artist to disable or enable a mask using by holding down the Alt key when clicking on the button. The status of the mask can be indicated, for example by varying how the icon is drawn. Possible states include, but are not limited to:

Mask does not have contents. This can indicate that the function's or container's mask does not have any inputs to the Mask container.

Mask has contents. This can indicate that that a function or container has inputs to the Mask container, but the mask is closed.

Mask has contents and is opened in the graph stack. This can indicate that a function or container has inputs to the Mask container and that the Mask container is open in the graph stack. A highlighted icon representation can be the same whether the mask is expanded in columnar mode, or has been opened in its own window.

Mask has contents but is disabled. This can indicate that the function or container has inputs to the Mask container but the Mask container has been disabled.

Mask has contents, is disabled and opened. This can indicate that the function or container has inputs to the Mask container, the Mask container has been disabled, but the Mask container is expanded in the graph stack.

A Clone Indicator 502H is a region on the widget which indicates that the container is a clone (e.g., that the container acts as a proxy for another item) and/or that the container is used in more than one location in the composite. For example, when this indicator is present, the path reveal button can allow the artist to see one or more other instances of the clone and their hierarchy paths. If a container is expanded, it can have the clone indicator on both the header and footer of the expanded container.

In some implementations, a container or function when seen inside of another container in the graph stack workspace does not have some of the elements which are visible when the container is isolated in the graph stack workspace in window mode. For example, a window in a workspace may be required to perform two functions which sub-objects visible inside another container do not require:

Be subject to removal from the visible workspace via a "close" function.

Be subject to inheritance from a parent container.

Therefore, in some implementations, the Path reveal button 502D.1 and close button 502E may not be visible when a container or function is shown inside another container in the graph stack workspace.

In some implementations, the following guidelines can apply when the user seeks to move a container. The container can be moved by dragging on the name of the container. Renaming the container can require a double-click on the name string to invoke the string editor and edit the name of the container in place. Additionally the container can be moved by dragging the footer of the container when the container is opened. Scratch containers can behave the same in all respects, can be renamed and closed with their respective controls. Dragging a scratch container into another container can create a generic container with the same name as the scratch container and set it to a default composite mode. When the container is being moved around inside of the graph stack workspace, the container (and its contents if open) should move along with the user's cursor. No ghosting of the element may be necessary. When dragging a contained item from one open container to another, the representation of the item being dragged can ghost to a semi-transparent opacity in order to allow the user to see placement of the object into another container. When dragging any container outside of the graph stack workspace window, a ghosted representation of the current item can be used to follow under the user's cursor. For example, dragged items may be ghosted only when they leave their own container. This can illustrate the difference between dragging contents versus dragging a top level item. If an artist drags a container or function, that is already in window mode, from its isolation in the graph stack workspace into another open container, the receiving container can be highlighted when the artist's cursor is over the recipient container. The representation of the container or function can then ghost to a semitransparent value. Additionally, a highlight insertion point can be shown at a location in the recipient container where the dragged object will be inserted. As the user drags an item about the graph stack and to other panels which can accept a drop event, any window/tab/panel which can receive the event can be highlighted to indicate that the object will receive the item being dragged.

FIGS. 6A-D show examples of revealing the path of an isolated container 600. Here, the container 600, entitled "Container_expanded" is in window mode and its contents—another container 602 entitled "Container_collapsed"—are shown. In some implementations a Path reveal button 604 is only visible in containers that are isolated in the graph stack in window mode. Upon user activation, this button shows the path to the current container from the root of the composite or scratch container which owns it. Here, a path 606 leads from the "Current Container" to a "Robot_Blur_Mask" container, from there to a "Robot_Blur" container, from there to a "Robot" container, and from there to a "shot_rbt257" container.

In the case of clones, several possible paths to the root can be revealed, for example as multiple horizontal path bars or "Breadcrumbs" stacked vertically when the user presses the button. The artist can select from one of the levels of the container's heritage, or dismiss the popup by clicking elsewhere outside of the popup menu.

When multiple paths to a clone are available, the currently selected instance can be shown as the path closest to the selected item. Here, for example, another path 608 (FIG. 6B) can be displayed, that includes a "Helicopter_Mask" container, a "Helicopter" container, and then the "shot_rbt257" container, which in this example is the same root as in the path 606.

In the path breadcrumb representation, each level of the hierarchy can have two parts:

1. Name of Parent—The name of a parent for each level in the path hierarchy.
2. Siblings Popup—An icon which reveals the siblings at of each of the levels in the path.

If the artist wishes to see the stack of siblings at a given level of the hierarchy, the artist can hover over the siblings indicator next to each container in the hierarchy to see the stack revealed as a vertical list. Here, hovering with the "Robot_Blur" container can reveal a sibling menu 610 (FIG. 6C) where the user can select any or all of the sibling items. When the cursor leaves the vertical stack popup, the breadcrumb path can remain visible as it was initially.

Any sibling can be selected and revealed in the graph stack workspace. If the user selects any of the parents in the hierarchy path, the currently selected container is closed and the parent which was selected in the path replaces the current window.

In the Path breadcrumb the user can drag the Path reveal button 604 from the current container up to an arbitrary level of the path. For example, the user here drags from the current container 600 (FIG. 6D) up to the "Robot" container, which is the second-highest level in this example. Doing so will open the parent of the "Robot" container—here the "shot_rbt257" container—and disclose the container or function at which the user ended the dragging (e.g., where the user dropped the dragged button). If the dragged-to item is a container, then it can be expanded (e.g., using the columnar expansion mode) so that its contents are visible. The current object can remain selected and its attributes can be visible in an attribute editor if open. In some implementations, this operation can also be performed upon the user holding down the shift key when clicking on the parent item.

In some implementations, modifier elements can perform different functions when held down while clicking one of the parents in the path hierarchy. For example: holding down the Shift key when selecting (e.g., when clicking) any level higher than the current level will reveal the parent container and expand to reveal the currently selected object. The current object can remain selected and its attributes can be visible in the attribute editor if open. In some implementations, the user can alternatively accomplish this by dragging across breadcrumbs. This can have the advantage of allowing an artist to quickly change the context in which the artist is viewing and working on a portion of the graph without destroying the current selection. Holding down the Alt key when clicking on any level of the path can reveal the clicked container in its own window in the graph stack workspace. A cursor change can indicate that a new window will be spawned.

The following describes examples regarding layout in one or more panels. Graph stack nodes can be expanded in outline mode by tugging downward on a disclosure toggle. A single container which by default is collapsed in a graph stack workspace can instead be expanded in outline mode. A possible exception to this involves functions which have no contents but have a Mask or other secondary input. These can for example expand to the right in columnar mode only. The expansion of these inputs may always take place in columnar mode. Their expansion is initiated from the expansion toggle on the right and is only way to reveal a secondary input. Functions have no disclosure toggle.

Representations can be made at any of multiple levels. For example, a first level of an outline can appear as a list with the contents collapsed by default. Using a method such as "Alt+ Click" the disclosure toggle can expand all children of the container in outline mode. In some implementations, all inputs can be expanded, to reveal all descendants from that level of the graph.

Figure 7:
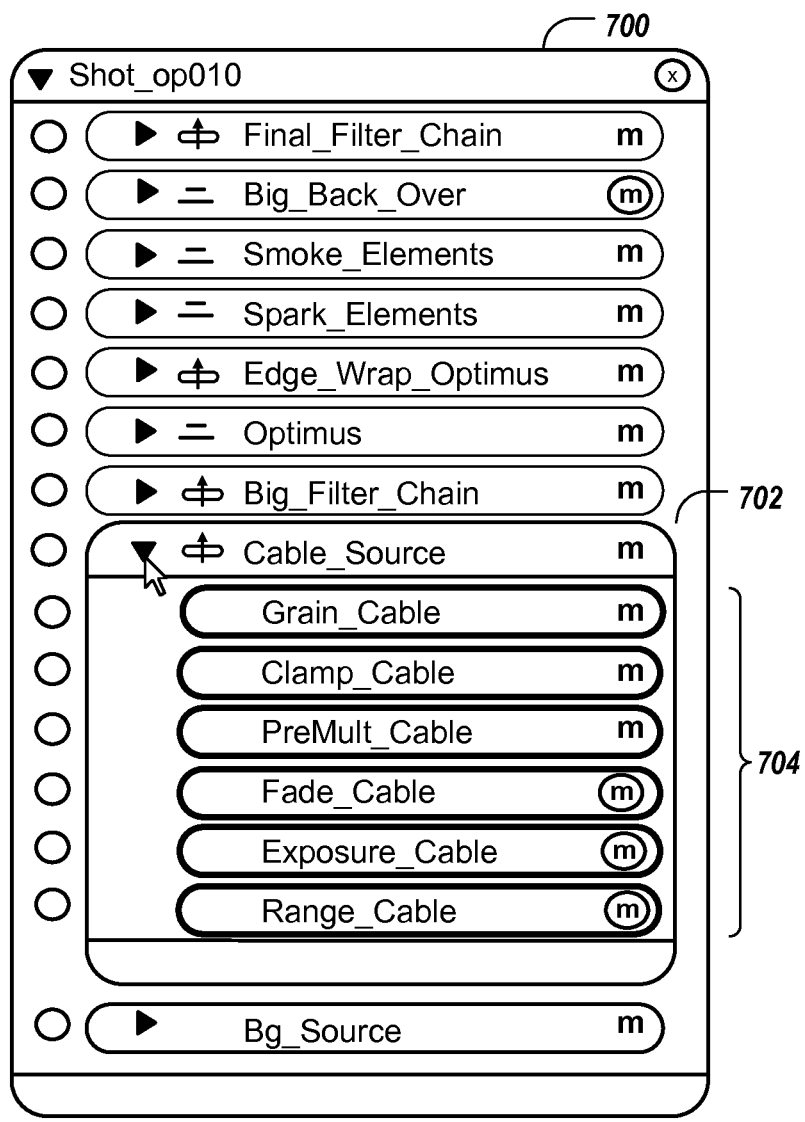
FIG. 7 shows an example of expansion in an outline expansion mode.

Contents of a container can be expanded in outline mode. Doing so can inset each subsequent level by a predetermined distance, for example 22 pixels, from one side, such as from the left side. The "Active" toggle can remain on the left of the newly revealed sub-contents, and can be padded 2 pixels from the left of the top level container in the window. The container which is opened will change its representation to have a header and footer. FIG. 7 shows an example of expansion in an outline expansion mode. Here, a a "Shot_op010" 700 includes multiple items, among them a "Cable_Source" container 702. The Cable_Source" container 702 has been expanded in outline mode and contents 704 are visible.

Another example of an expansion mode is columnar expansion. In some implementations, a columnar expansion mode can be characterized by the following. The graph stack layout is described here with rules for how to expand and layout portions of the stack into columnar mode. The layout of containers in columns have a primary to secondary relationship. The primary column is considered the "Root" of the relationship of the two columns. The primary column also manages the vertical stacking order of the containers. When more than one container is expanded into the secondary column, the stacking order of the primary column controls the vertical stacking of expanded items in the secondary column.

Other considerations that in some implementations can guide the final rule set include:

Expanded containers should be non-overlapping. As in the outline view of a stack, expanded containers in columnar mode can avoid one another in the same column.

Horizontal expansion, such as to the right, can be done with the purpose of maintaining a relatively small distance to the insertion point in the root stack. Expansion of a container or node to the right should be done as closely as possible to the vertical center of the item in the primary column. This can be considered a "Vertical Centric" approach with the root object in the primary column being the center about which to determine the rule for vertical placement of the expanded item into the secondary column.

Usability testing can be used to verify interactions and proximity in cases of multiple expanded items.

A minimum vertical width of a column can be defined. A horizontal width of each column could be adjusted by the user via a vertical splitter handle which could be invisibly located on the right edge of each column. The cursor should change to reveal the splitter handle. Additionally, a mouse-over could indicate that the tool is available, by highlighting a vertical bar on the right edge of the column. Adjusting this bar would adjust the column's width to the left of the splitter and drag the right-hand columns along with it.

The primary column acts as the parent item. When a user drags the primary column via its header, the secondary column(s) can follow the parent without disrupting their current relative positions. This means that transforming the parent object transforms its children so that they act as a "group".

Expanded containers can be slid vertically. By default containers expanded into a column are centered on their horizontal axis with the node in their parent's column on the left. The artist can slide the contents of a secondary column vertically by dragging one of the headers in the column up and down. All contents of the column will slide as a unit maintaining their vertical layout. If columns are expanded into a third column, this will move them vertically also. A nile of thumb can be that columns on the left hand side have the ability to slide the vertical positions of column items on the right hand side.

Another column can be assigned upon the user slides an expanded container further in the direction of the columnar expansion. When multiple nodes in the primary column are expanded into the secondary column, dragging the header or footer of a container in the secondary column to the right will place the expanded container into a new, third column. There must be a minimum of one container remaining in the secondary column, or else the dragged container should remain in the secondary column.

When a new column is spawned, the goal of vertical centricity should apply to the layout of the new column. Additionally, the previous column should collapse space where possible to keep the vertical height as compact as possible without re-routing nodes extenders.

Multiple overlapping stacks can be permitted in a given graph stack workspace. User selection can elevate a group to the front in z-index order and place the group in front of the other open stacks in the workspace. The columns for a given group will be relative to one another only. In some implementations, it is not desirable for columns of non-connected groups to avoid overlapping one another, they are relative only to their groups contents. This can help reinforce the relationship of contents to their root.

The user can collapse the window with the disclosure toggle, and this should trigger the entirety of the windows contents to be hidden in the workspace. For example, expanding the window via the root would re-instate the expanded secondary columns as they existed prior to collapsing the window.

By default, closing the root container would close the children as well. By holding down the Alt key and clicking the "Close" button in the interface, the user could force each of the expanded containers in the secondary columns into its own "window" modes, leaving them visible in the workspace for editing.

Figure 8:
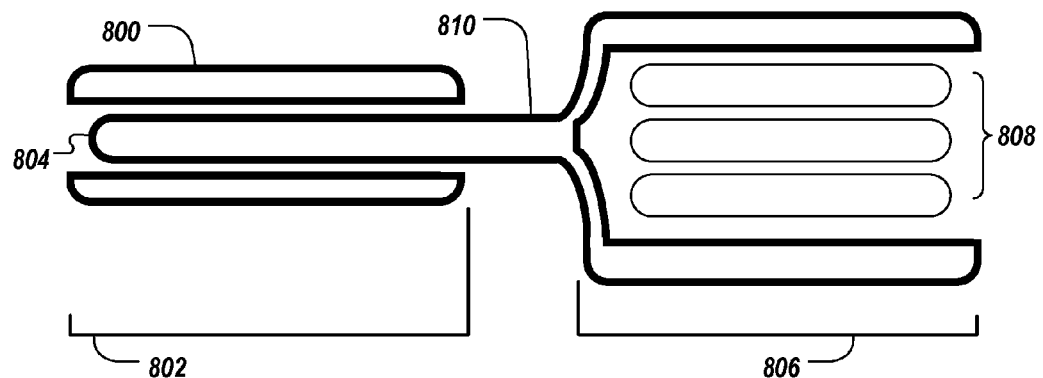
FIG. 8 schematically shows an example of expansion in a column expansion mode.

FIG. 8 schematically shows an example of expansion in a column expansion mode. Here, a container 800, is located in a primary column 802. The container 802 is currently expanded in outline mode, and its contents (e.g., another container 804) is exposed accordingly. The container 804 is expanded horizontally using columnar expansion mode.

In some implementations, expanding an element horizontally into columnar view extends the pill shape in that direction, and reveals the expanded item in a stack in a secondary column to the right of the node in the primary column. Here, the container 804 is expanded into the second column 806 and its contents 808 are presented. When a single item from the primary column is expanded, the stack in the secondary column is centered vertically above and below the pill shape which extends from the primary column. Here, the contents 808 are centered on the container 804.

In some implementations, a thirty-pixel margin can be created between the right edge of the primary column and the left edge of the secondary columns. The following is a possible exception to the margin rule: a vertical bar (stem) of a certain length (e.g., five pixels) can extend upwards and downwards from the element which is expanded from the primary column. This five-pixel vertical bar can be drawn in the thirty-pixel margin.

Showing the container expanded in the secondary column allows side-by-side comparison to the root. The secondary column's contents can be centered vertically on the element from which the container expands from the primary column. Here, the contents 808 are visually connected to the container 804 using a graphical element 810. It may be desirable to have the secondary column not extend out of the current view in the graph stack. In some implementations, some automatic framing behavior can be allowed, and/or the user can be allowed to drag the header of the secondary column vertically to reposition the secondary column, for example to line up horizontally with the primary column.

Animation of the object expanding can happen when the object opens and collapses. The animation sequence can use a simple wipe in the direction of the action of expansion or collapsing. For example, when the container expands, using a simple horizontal wipe of the container from left to right over a 0.3 second interval can communicate to the user that the object is expanding to the right. To collapse, a simple wipe in the opposite direction from right to left can have the same implication to the user.

A wipe can be used to reveal an expansion of part of the graph stack. Zooming up from small to large should be reserved for showing a window of detail of a different type of data. For instance, showing a HUD or In-Context Editor with a connection to the node it is editing could be done with a zoom "Pop-Up" approach to represent that the data being revealed is a detail of the current object.

Figure 9:
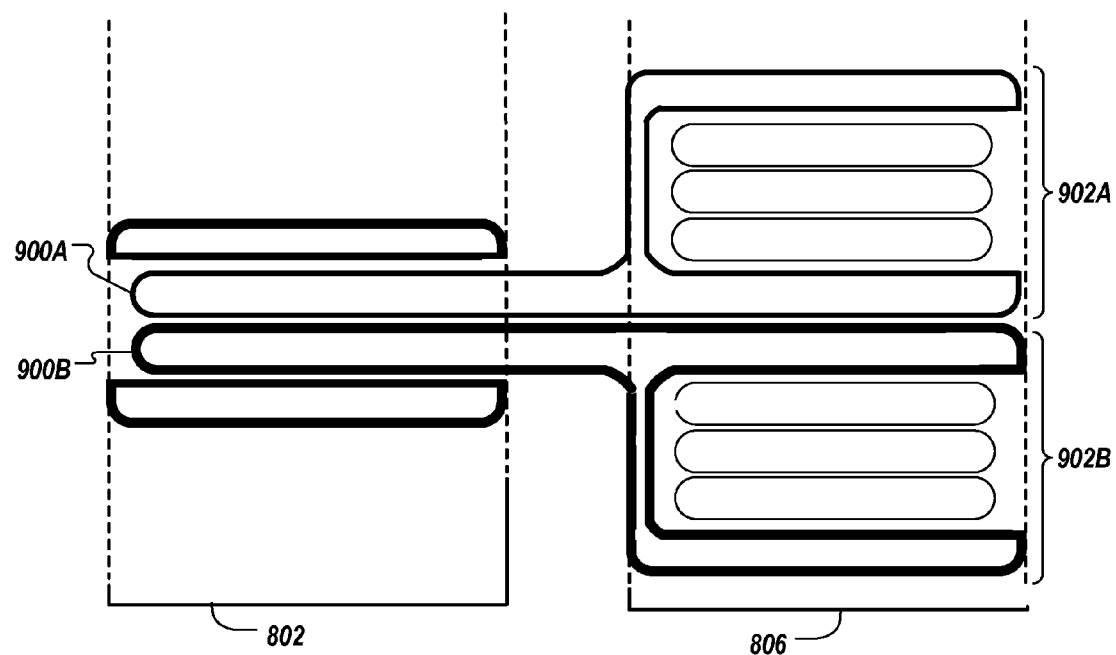
FIG. 9 schematically shows another example of expansion in a column expansion mode.

In some implementations, more than one container can be expanded into another column concurrently. FIG. 9 schematically shows another example of expansion in a column expansion mode. Here, primary-column containers 900A and 900B are expanded horizontally to show corresponding containers 902A and 902B, respectively. The vertically centric rule can be followed when expanding two or more items in the secondary column. For example, each item can expand with respect to the stacking order represented in the primary column. This can preserve continuity of the layout and the meaning of the stack regardless of which column the items are expanded in. For instance, when expanding in outline mode in the primary stack the containers would expand in place and the meaning of the stack would be preserved.

Collapsing one of the two containers 902 in the secondary column can force the other to become vertically centric, for example as shown in FIG. 8, with the difference that the container 800 would have two items instead of one as shown in that example. Vertical centricity of the bounds of the secondary column against the vertical bounds of the root nodes being expanded from the primary column can be selected based on usability testing. A two-pixel padding can be maintained vertically between stacks in the secondary column to match up with a two-pixel padding of stacked elements in the graph stack.

The transition from a single open item to two or more open items in the secondary column can be animated, for example along the lines described above. For example, the pre-expanded stack can be moved up or down in the secondary column to accommodate the newly expanding element. The expanding element can then complete the animation by being revealed in the secondary column, with a wipe from left to right. Collapsing one of the items would simply reverse this sequence of events.

Figure 10A:
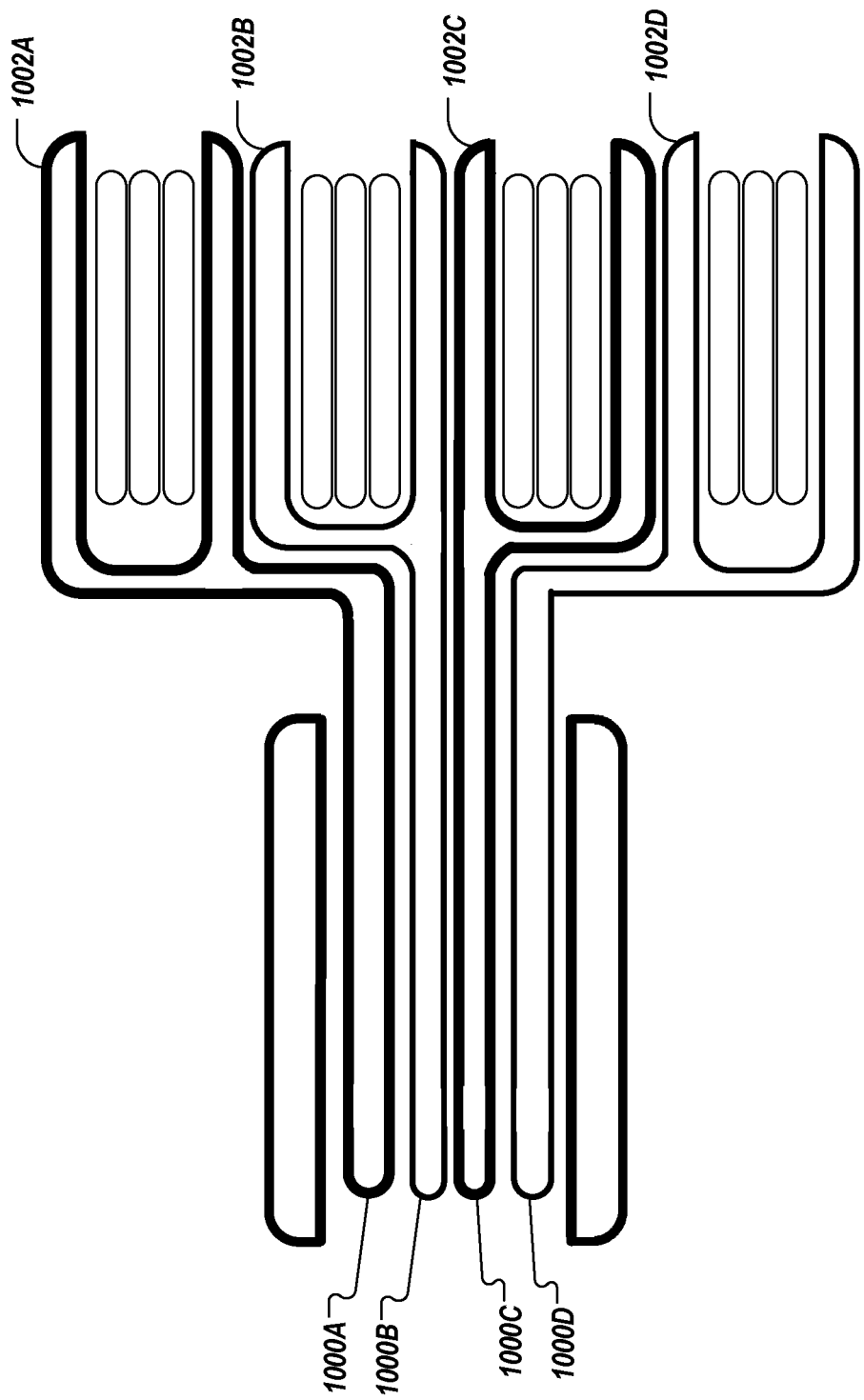
FIGS. 10A-B show other examples of expansion in a column expansion mode.
Figure 10B:
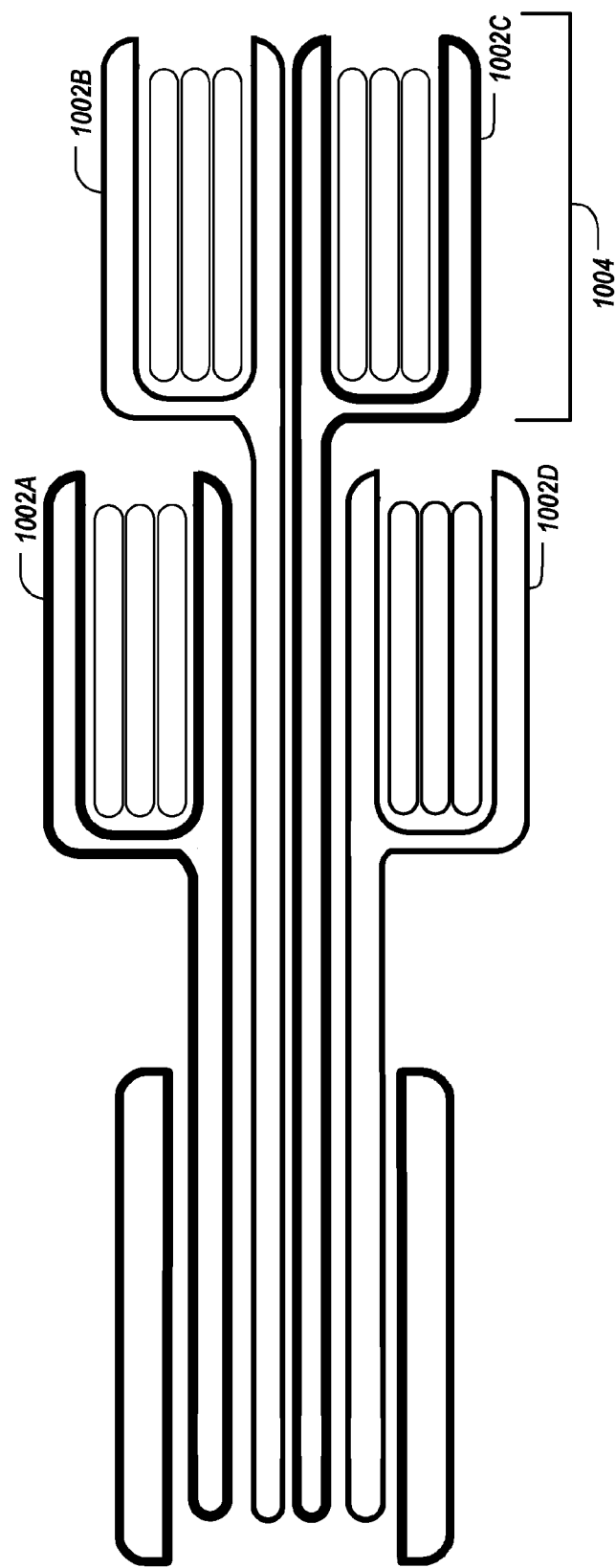

FIGS. 10A-B show other examples of expansion in a column expansion mode. Here, four containers 1000A-D that are in close proximity of each other are expanded from the primary column into the secondary column. In the secondary column, corresponding containers 1002A-D are visible. The containers 1002A-D are symmetrically placed with regard to the primary-column containers 1000A-D. For example, the centermost two expanded containers 1002B and C are connected to the corresponding containers using essentially linear visual elements in the margin between the primary and secondary columns. The visual elements for the outer expanded containers 1002A and D, on the other hand, are non-linear to accommodate the positions of these containers, which are offset vertically. This arrangement reinforces the vertical centricity for the user. Minimum padding is here illustrated using the two-pixel margin.

Vertical placement can be judged by overall proximity of the contents of an expanded item in the secondary column to its root in the primary column. Placing the expanded item at a minimum distance may be desirable. It may be useful to allow the user to slide the entire secondary column on the vertical axis by dragging one of the headers vertically in the column to adjust the entire stack of open containers. This would shift the neighbors up and down, in a sense analogously to the situation where the container being dragged is the parent of the group of containers.

The user can rearrange one or more items, such as an expanded container. FIG. 10B shows that the user has caused the centermost two expanded containers 1002B and C to be relocated into a third column 1004. The expanded columns 1002A and D were not included in the dragging in this example and therefore remain in the secondary column. Here, the expanded columns 1002A and D have been adjusted vertically into a close proximity of the visual elements that connect the expanded containers 1002B and C with their corresponding containers in the primary column. This can correspond to a vertical splitting of the secondary column into "high/low" regions with close proximity nodes in the primary column. The containers 1002A and D are oriented above and below the center points of the corresponding primary-column containers, in analogy with how the containers 1002B and C were placed in FIG. 10A. The horizontal grid spacing can be maintained for any of an arbitrary number of created columns. The user can drag the vertical/middle items horizontally (e.g., to the right), such as using the header or footer of the node, to collapse the vertical space if needed. In some implementations, the above configuration makes it possible to use any of three columns and eight expanded nodes. Because the visual elements by which the expanded columns stem from the first column pass through the secondary column on the way, the columnar expansion may be essentially limitless. In some implementations, the rule set could allow expansion essentially to an infinite degree, using four groups per column. The example shown in FIG. 10B can be useful in helping the user maintain a series of open containers with respect to the root of the stack, and it only requires relatively little vertical space.

Figure 11A:
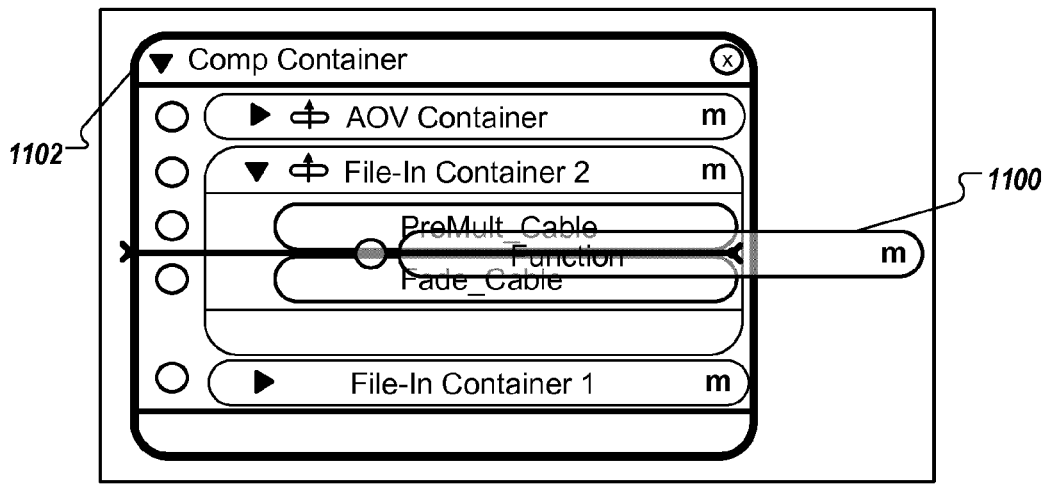
FIGS. 11A-C show examples of operations in assembling image functions into an order inside a container.
Figure 11B:
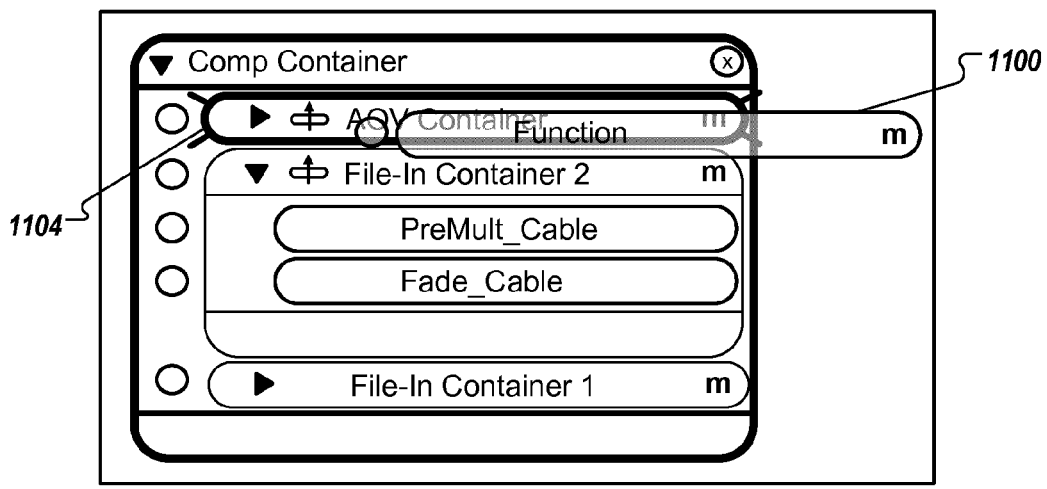
Figure 11C:
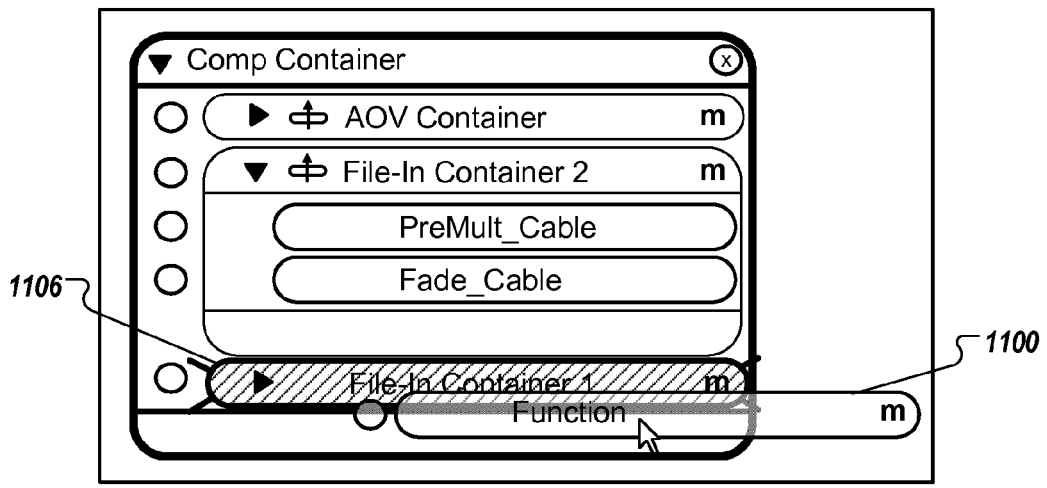

FIGS. 11A-C show examples of operations in assembling image functions into an order inside a container. Nodes can be dragged from one container to another in the graph stack to re-arrange the nodes. As another example, the user can move an open container by dragging its title in the header. Doing so has all the same interactions as a collapsed node. In some implementations, the collapsed version of the container is used to illustrate dragging of the expanded container to simplify the representation. When the artist drags a node, the following set of behaviors can occur:

The object being dragged can be highlighted in the graph stack workspace with a one-pixel 50% opaque white outline around the node's edge. The object being dragged can also have a soft drop shadow to visibly lift it from the other contents of the workspace. This can happen for each selected node. A 50% opaque copy of the object being dragged can be attached to the user's cursor. Here, a user is currently dragging a function 1100 labeled "Function" over a container 1102.

In cases of multiple nodes being dragged, the nodes can group together neatly into a single ghosted stack under the cursor. When placed, in their new location, they will be organized in this order. They can stack in an order that satisfies the following rule-set:

When the order matches the order of the nodes in the stack in which they came from, then the negative space between nodes is collapsed to a single unit.

When nodes are selected from different containers in different parts of the graph, the entire tree stacking order is considered.

In cases where there are ambiguities of stacking order due to clones, container stacking is first considered, then user ordered selection is considered. The user can select from multiple containers and each node's local stacking with its siblings should be true. The order of clicking can establish the order of the families of nodes under the final drag operation. In some implementations, there is no visible grouping but the ghosted stack can reflect that the nodes are next to their siblings first, and then families are stacked by order of which family was selected first.

The family of nodes that was last selected will be on top of the ghost stack.

At the position where each node resided prior to the drag operation, its representation can be grayed out to 50% of its opacity. No space is collapsed. In the case where there are multiple nodes which are selected this can happen for each node. This can help the artist easily see where their objects came from.

While the user is dragging around the graph stack, other receiving containers should react to the cursor with various behaviors based on the type of object the cursor is currently over:

The following are examples of rules that can be applied when the dragging cursor is inside any open container. While the artist drags the object up and down in the stack, the nodes which are in the container can remain static. As the artist drags the node or nodes up and down the stack, an insertion point indicator can show where the nodes will be placed in the stack. For example, in FIG. 11A, the insertion point for the function 1100 is currently shown between functions in the container 1102. In the case of multiple nodes being dragged simultaneously, only one insertion point will indicate where the group will be dropped into the container. The container silhouette (header and footer included) inside which the cursor is currently hovering can have a highlight of a one-pixel 75% opaque white outline to indicate that the container will be receiving the nodes under the cursor. For example, in FIG. 11B a container 1104 is currently highlighted because the function 1100 hovers over it. If the container inside which the cursor is currently hovering cannot accept the node(s) being dragged, the container silhouette (header and footer included) can highlight with a one-pixel 100% opaque red outline to indicate that the container will not accept one or all of the node(s). For example, in FIG. 11C a container 1106 cannot accept the function 110 that is being dragged over it and the container 1106 is therefore highlighted. Hovering the cursor over the header of the container will show the insertion point at the top of that container's stack. Hovering the cursor over the footer of the container will show the insertion point at the bottom of the stack. Some additional rules may apply to what nodes can be at the bottom of a container depending on the container type.

The following are examples of rules that can be applied when the user drags an item onto a collapsed window or container. A collapsed container can first be highlighted with a special container targeted highlight. The highlight can be a one-pixel 100% opaque white outline around the silhouette of the container with 45° short white one-pixel lines extending from each rounded corner of the shape, resulting in a crosshair target representation. If the user does not keep the cursor hovering over the container for at least a predefined interval (for example a one-second, and/or user-defined, interval), and instead continues moving around the workspace, then the targeted highlight disappears and nothing happens. If the user keeps the cursor hovering over the container for an interval greater than the predefined interval, the container can automatically expand in outline mode and reveal its contents. The expanded container can now have a highlight around its silhouette. An insertion point indicator can follow the cursor as the user moves the cursor through the stack. If the cursor leaves the container that was automatically expanded by the user's hovering during a drag event, that container can collapse after a predefined interval (for example a one-second, and/or user-defined, interval). This lets a user investigate where they may want to drop the contents of the cursor prior to committing to it, or else cancel the drag operation. If the container over which the user is hovering the cursor cannot accept the contents of the drag operation for any reason, the container can first be highlighted, for example with a special container targeted highlight, optionally with the exception that the color can be red. This will indicate to the user that the object will not accept the contents of the dragged item. A container which cannot accept the contents of the drag for any reason should still expand after the predefined interval.

In some implementations, the user can cancel a drag operation, for example by hitting the Escape key at any time before releasing the mouse button. This can leave each originally selected element in its original locations and can leave it or them highlighted and selected.

The following are examples of rules that can be applied when the user is dragging nodes from the graph stack to other panels. Nodes can be dragged to other panels to view a node in the type of panel to which the node is dragged. The receiving panel determines the way in which to represent the node. Regions of the panels can have different meanings and allow the artist to perform different operations in the interface based upon where in the panel a node is dropped. A list of example panels which can receive nodes includes, but is not limited to:

A viewer panel. Dragging into the panel and dropping a node onto the viewer can set the viewer to be above the node dropped in, and can refresh the front-most tab with the render from that point in the graph stack. Dragging into the panel and dropping the node onto the tab bar can create a new viewer with the same position in the graph as described above. Holding down the Alt key and dragging into the image can populate the viewer with a view of only the branch of the node being dragged into the viewer. This can isolate the branch before the composite mode with the rest of the stack and render that result in the viewer.

An attribute editor shelf. A user can park the attribute editor for the node in the attribute editor shelf. The window containing the item can be closed or deselected in the graph stack workspace. Its attributes can remain live and editable in the attribute editor shelf. Dragging the item into the tab bar region of the attribute editor shelf can create a new tab in the attribute editor and can park the attribute editor for the node being dragged into it.

Figure 12:
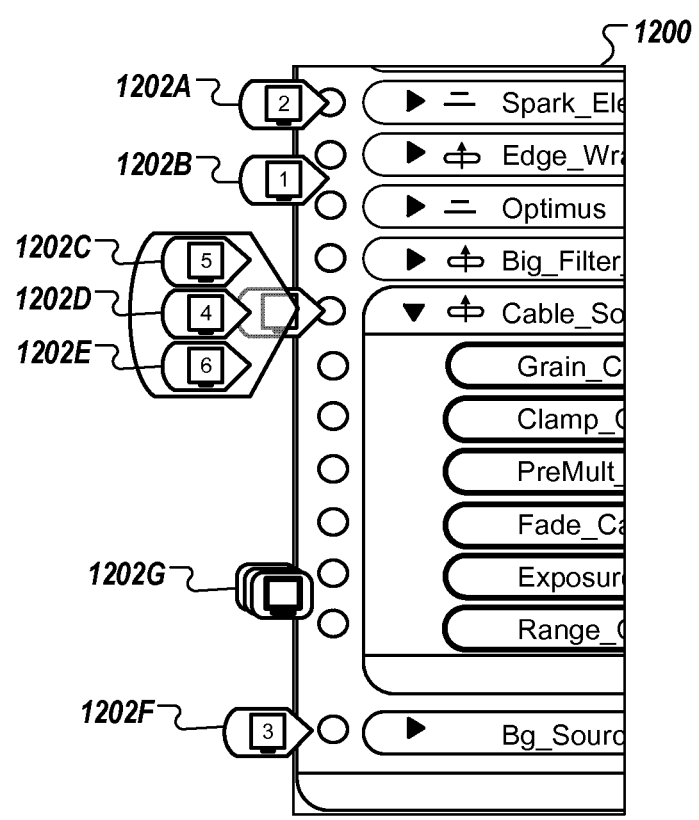
FIG. 12 shows an example of views into a visual representation of a composite graph.

Viewer tabs can be represented in the graph stack to allow the artist to view different portions of the composite. FIG. 12 shows an example of views into a visual representation 1200 of a composite graph. One or more pointer icons 1202 can be used to provide views into the graphical representation. This gives the artist a tool to see selected portions of the composite, and have control over multiple views into the same composite at various levels. The viewer object can be dragged about the graph stack to easily change the position of a viewer. Additionally, by representing it as an object in the graph stack, the artist can quickly manipulate it with the keyboard.

In terms of representation, the viewer can have two modes to facilitate work in the composite. These can be represented in the graph stack by the pointer icon 1202 which can either point to a container (e.g., the pointer icon 1202A) or to a point between nodes (e.g., the pointer icon 1202B). In some implementations, pointing to a container means that the viewer is rendering an isolated branch of the container to which it is pointing. The composite mode can be bypassed and the viewer shows the branch prior to its composite. This mode is only available on containers, not functions.

When pointing is done between nodes, the viewer is rendering up to that point in the comp. The result of the composite up to the point and including the node immediately before the viewer icon in the graph stack is rendered. For example, in an implementation where stacked functions are performed from bottom to top of the stack, the rendering covers the result of the composite beginning with the bottommost function and up to, and including, the node below the pointer icon, but does not include functions higher up in the graph.

There can be four modes of the viewer's icon in the graph stack:

Foreground tab. This indicates that the viewer is the front-most tab in the viewer panel. When the viewer icon is selected, there is a heavier white outline on the icon, and a drop shadow indicates the object is selected.

Background tab. This indicates where the viewer is located in the graph stack but is behind the other tabs in the viewer panel. For example, a background tab is visible behind the pointer icons 1202C-E.

Nested view. This indicates that a collapsed container has a viewer inside of it. The icon points to the container in which the viewer resides but is represented in a ghosted mode. For example, pointer icon 1202F represents a nested view.

Bookmarked view. This indicates that a view has been saved as a bookmark in the bookmarks bar of the viewer panel. For example, pointer icon 1202G represents a bookmarked view.

There can be two states of the viewer icons in the graph stack: Selected, which indicates that the object is currently the active selection of the graph stack, and deselected, which is the resting state of the icon. For example, the pointer icon 1202A is currently in the selected state and the pointer icons 1202B-E are currently in the deselected state.

Viewer icons can indicate multiple views. In some implementations, viewer icons can point to a node or between nodes. Multiple viewers can be visible simultaneously in a single graph stack workspace. For example, the primary position of the view icon can be immediately to the left of the node. An exception to this can occur when two viewers are looking at the same container, at different outputs. The spacing for these two representations can be eleven pixels apart on the vertical axis, but icon spacing is 22 pixels on the vertical.

The icons can be allowed to overlap one another in Z-index order.

Multiple viewers and multiple snapshots can be located at the same point in the graph stack. For instance, one viewer may be rendering the RGB of a node while another viewer is rendering the mask. A special representation can be used to allow the user to open the stack of viewers available and select one of the viewer icons.

The following are examples of interaction with a visual representation of a graph. Selecting a viewer icon in the graph stack makes its corresponding tab in the viewer panel the front-most tab. The mode will change accordingly. The active selection and drag region for a viewer icon is the left side of the object. The part of the icon which appears to cover the active/inactive toggle of a node is non-functional. Mouse clicks on that region will pass through to the node underlying the viewer icon and disable/enable it.

The artist can drag the viewer around the graph stack and also use the keyboard to move the viewer up and down the graph stack. In contrast, up and down arrows on the keyboard might only allow the viewer to reposition up and down in the current view in outline mode. To descend into a closed container, or to move the viewer into a container which is expanded in columnar mode, the artist would use the right arrow. In the case of opening a closed container, doing so can open the closed container one level and place the viewer at the top of the stack. In the case where the container is already expanded in columnar mode, the viewer can be relocated over to the top of the stack in the column.

If there are multiple levels currently expanded in outline mode in the column where the viewer is selected, keyboard navigation should not let the viewer descend into an open container unless the artist has used the right arrow to explicitly descend into that container. In some implementations, the viewer would only move up and down the stack at its current level unless the user issued the instruction to descend. When the viewer moves up one level as the top or bottom of a container is reached, the viewer should remain at its new level until instructed to descend a level.

The artist can jump from one input to the next, here termed "puddle jumping." To puddle jump from one adjacent container into the next, the ALT+Up/Down Arrow can be used to jump into the next container without first ascending a level. Puddle jumping may be permitted only within currently visible containers. Puddle jumping to a collapsed container can expand the container in outline mode. If a container is expanded in Column mode, the viewer can jump into it in the column.

Puddle jumps also work for a Mask container. The artist can use the Shift+Up/Down Arrow method to puddle jump. When the viewer is pointing to a node with a mask, the artist can jump to view the output of the Mask by pressing SHIFT+Right Arrow. This will open mask and move the viewer to the top of the Mask's stack. The same behavior can apply to any container which has a secondary input.

Macros with multiple inputs can be navigated. A modifier can be used to navigate their inputs. For example, SHIFT+Right Arrow can trigger the macro to reveal any concealed inputs. The viewer will by default jump to the top secondary input, expanding it in the graph stack. When the viewer is viewing the top level of the input, the left arrow can make the viewer jump up a level and view the output of the macro instead. The input can be auto-collapsed.

If the artist drops the viewer in a blank space in the graph, the viewer is deleted, and the tab is closed. Holding down the Alt key before dragging the viewer can spawn a new viewer tab in the viewer panel. This preserves the existing viewer tab in the viewer panel and makes a new tab for the new viewer. Selecting the nested view version of the icon will expand the container in outline mode in the graph stack and select it. When the container is expanded, the icon for the viewer will leave its position at the container level, show its location inside of the container, and change its representation to the foreground tab mode. A double click on a bookmarked viewer will load that bookmark into the front-most tab in the viewer panel.

The methods of interaction for loading a bookmark for the viewer from the graph stack workspace can be identical to the functions when the user clicks on a bookmark in the viewer panel's bookmarks bar. This includes methods for loading the viewer bookmark into a new tab, versus overriding or destroying the current viewer. Holding down the ALT key while double clicking the viewer bookmark can spawn a new tab in the viewer for the bookmark. The viewer panel spawns a new tab for the bookmark, and moves it to the front. The icon in the graph stack can change to the active or selected version of a viewer icon.

Figure 13A:
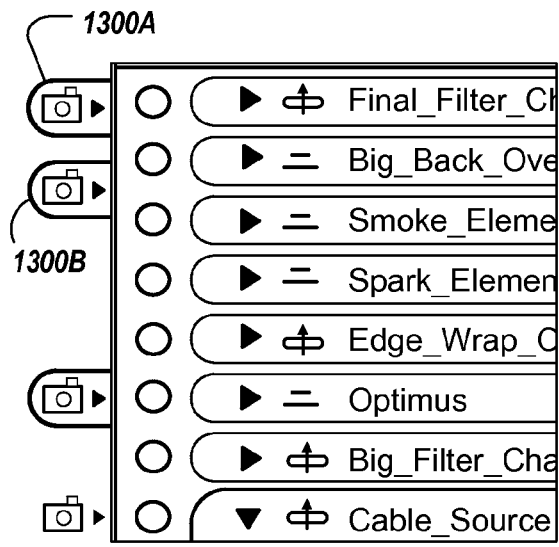
FIGS. 13A-C show examples of icons corresponding to viewer snapshots of a visual representation of a composite graph.
Figure 13B:
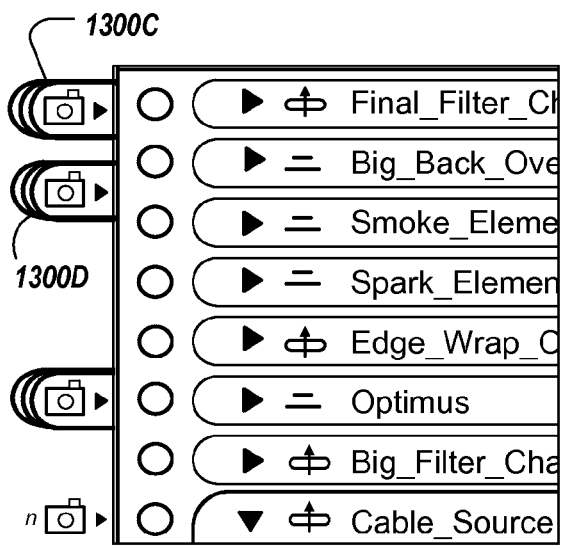
Figure 13C:
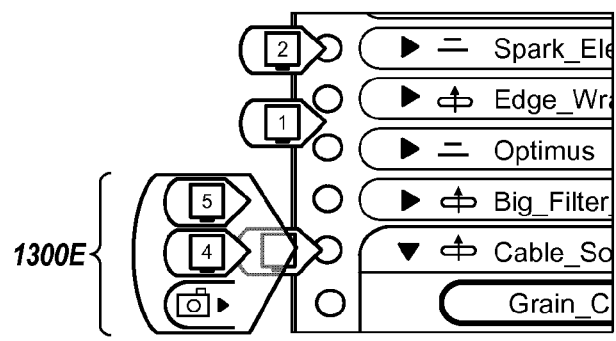

FIGS. 13A-C show examples of icons 1300 corresponding to viewer snapshots of a visual representation of a composite graph. A viewer snapshot can be a saved pixel buffer of a composite. The snapshot of the buffer is saved when instantiated by the artist and can be accessible to the project to be saved with it. The use of a snapshot can enable the artist to see the state of a composite as it was at an arbitrary point in the build history of the composite. One or more viewer snapshots can be used.

In some implementations, the snapshot does not hold any special knowledge of the wiring of the graph or of the graph's attributes; rather, can be an image. Attributes attached to a snapshot with regards to the graph stack include the location in the comp from where it came. The snapshot is instantiated in the viewer. The graph stack represents the presence of the snapshot at the point of the graph where the viewer was parked when the snapshot was taken.

The representation of the snapshot can show the icon 1300 in the graph stack parked next to the point in the graph where the snapshot was taken. For example, FIG. 13A shows the icon 1300A positioned next to a container and the icon 1300B positioned in between two containers. Multiple snapshots can exist at the same location. These can be represented with a special indicator in the graph stack next to the icons. For example, FIG. 13B shows the icon 1300C that represents multiple snapshots. As another example, the icon 1300D is positioned in between two containers.

The icon may occupy the same location as the viewer icon in the margin of the graph stack. The representation of a viewer at the same location overrides the buffer representation. In some implementations, a "multi-view" icon can expand to show the artist the possible viewers and snapshots available at the location and allow the artist to select one of the snapshots or viewers. For example, FIG. 13C shows the icons 1300C represented by a multi-view icon 1302.

The vertical position alongside the nodes in the graph stack implies the snapshot's position of the view of the graph. Just as viewers can isolate an object, or view the output from a point in the graph stack, the snapshots can have the same characteristic of being able to be placed on or above a node for representing both cases.

The following are examples of rules that can be applied to interaction, in some implementations:

The buffer icon cannot be moved in the graph stack. It is located at a specific point in the graph stack to indicate where it was taken in the graph. If the area of the graph is no longer valid, it will still be visible in the project browser, but will not exist in the graph stack.

The snapshot can be selected. Doing so will:

Load the Snapshot into the front-most viewer panel

Populate the attribute editor with the buffer's attributes and move that buffer into the front-most viewer tab.

The attributes for a snapshot are name and date/time stamp as well as any notes which the user has placed on the snapshot.

The snapshot can be deleted after selecting it. Deleting the snapshot can change the viewer over to the current graph rendered at the same location, switching it to "live" mode.

Figure 14A:
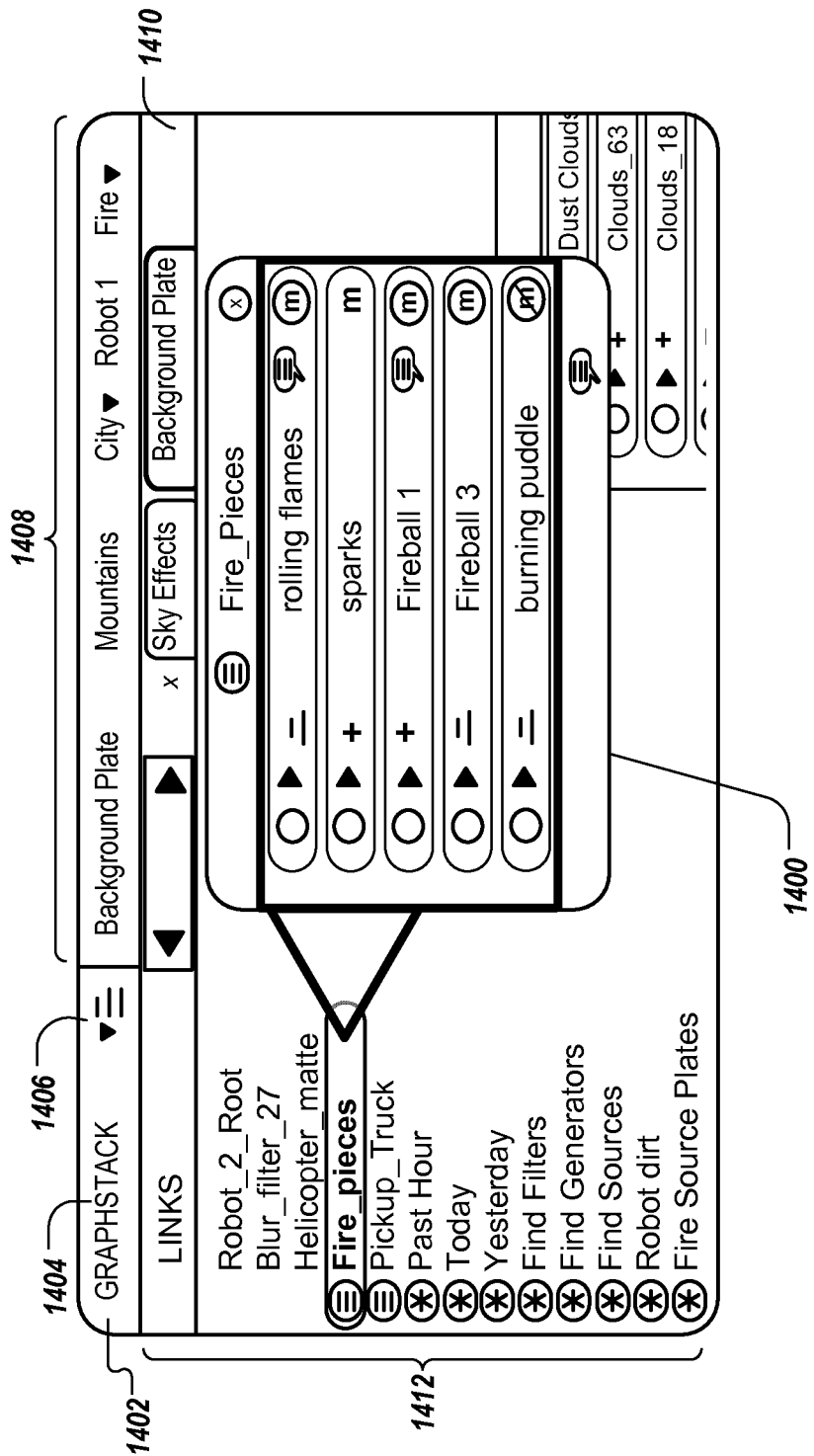
FIGS. 14A-B show examples of groups of items.
Figure 14B:
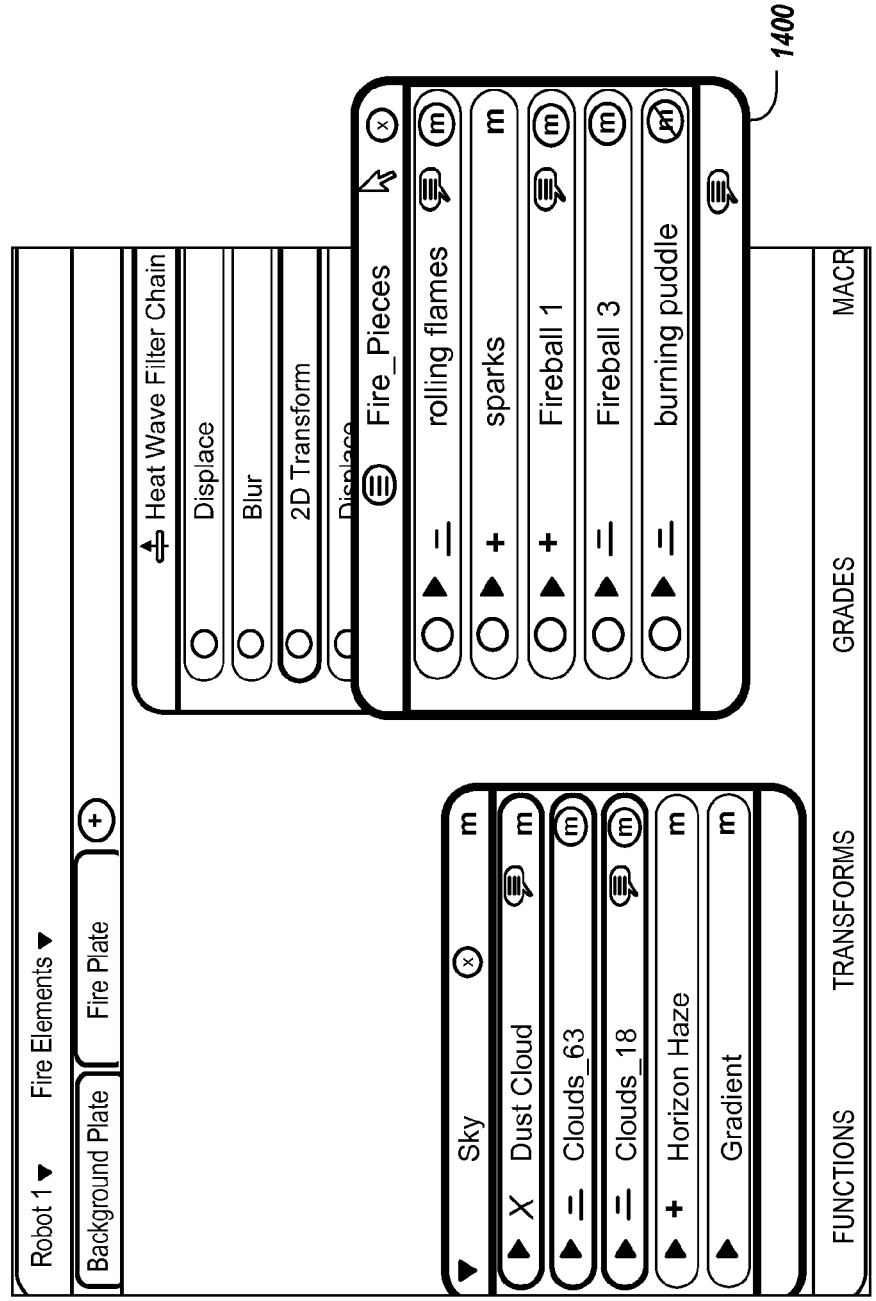

FIGS. 14A-B show examples of groups of items 1400. The graph stack panel can contain multiple components depending on the nature of the work to be in the panel. The following panel components can be included in a panel header 1402:

A name 1404 is the primary data in the panel header 1402. It shares the same row across the panel with the graph stack bookmarks and menus. In some implementations, the panel header is the only region of the panel by which the panel can be dragged to re-arrange panels in the workspace.

A panel menu 1406 contains commands specific to the front-most workspace tab, and general graph stack specific commands. The panel menu can be located immediately next to the panel in the header and can appear as a part of the panel header to identify it as the menu that is specific to the panel.

A bookmark bar 1408. One or more workspaces can be saved for recall later by the user. The bookmark bar holds links to saved workspaces and groups of workspaces. Groups can be indicated with a triangle next to the name of the bookmark.

To add a bookmark to the bar, the artist can perform any of the following actions:

Drag a tab to the bookmark bar. A bookmark is added for that tab.

Right-click a tab (even background tabs) and select "New Bookmark . . . " from the pop-up menu.

Drag from the blank-space to the right of all the tabs in the Tab Bar, up to the bookmark bar. This adds the set of tabs as a group to the bookmarks bar 1408. The entire set of tabs can be restored with a single click.

Right-click in the blank-space to the right of all the tabs in the Tab Bar, and select "New Bookmark . . . " from the pop-up menu.

Right-click a blank space in the bookmark bar and select "New Bookmark . . . " from the pop-up menu.

Click on the bookmark menu and select "Add Bookmark . . . " The front-most tab will be added as a bookmark.

Rearranging of the bookmarks can be implemented as a simple drag left-right operation by the artist.

To delete a bookmark, the artist can perform any of the following actions:

Drag the bookmark from the bar, into the negative space of the graph stack.

Right-click the bookmark and select "Delete Bookmark" from the pop-up menu.

From the bookmark menu select the submenu item "Delete bookmark . . . >/[bookmark_list]"

In the list of bookmarks in the bookmark menu, the user can hover on a bookmark to delete, and click on the "-" icon to the right of the bookmark, to delete it.

If the list of desired bookmarks in the bookmark bar 1408 exceeds the available horizontal space available, an ">>" icon will appear on the far right side indicating there are more bookmarks available than can be shown. Clicking on the icon will open a menu from which the artist can select a bookmark.

To rename a bookmark, the artist right-clicks the bookmark, and selects "Rename . . . " from the pop-up menu. A modal dialog can appear and allow the artist to change the title of the bookmark.

The bookmark menu contains commands for managing the bookmarks of graph stack workspace layouts. This menu should include a sub-menu to list all bookmarks for the graph stack workspace, including those not visible on the bookmark bar.

Visibility of the bookmark can be implicit when the user creates the bookmark via any of the above noted methods.

Visibility of a bookmark can be managed via the bookmark menu. The menu can include a checkbox, for example to the left of each bookmark in the menu, to facilitate this. The checkbox enables visibility to be controlled for each bookmark in the bar without requiring additional dialog boxes. Un-checking the box will turn off visibility in the bookmark bar. To delete a bookmark, a "-" icon can appear on the right side of each bookmark, upon hovering in the menu, and provides a quick way to delete bookmarks from the list. This method does not require an additional dialog box.

The panel header can include a tab bar 1410. In some implementations, the workspace has no tab by default, only a title of the current workspace. Tabs can be generated when there is more than one workspace in the graph stack.

To create a new workspace, the artist can perform one of the following actions:

Click the "+" button to the right of the workspace name (or to the right of the right-most tab) in the tab bar 1410.

Right click in the tab bar blank space (not on a specific tab) and select "Create New workspace . . . " from the pop-up menu Drag a node from the front-most graph stack workspace into the blank space of the tab bar to create a new workspace with the node as the sole occupant in set in window mode.

Re-arranging the tabs can be done by dragging the tab's title to the right or left in the tab bar.

Dragging a tab from the graph stack performs an action depending upon where the tab is released. For instance, dragging a tab from the graph stack and dropping it, can trigger an action as follows:

Tab is dropped onto the bookmark bar—this creates a bookmark for that workspace. The tab remains in the graph stack's tab bar.

Tab is dropped onto another graph stack panel—this moves that workspace to the destination panel's set of tabs.

Tab is dropped onto the timeline panel—creates a tab in the timeline-editor with the nodes currently visible in the graph stack visible as tracks in the timeline.

Tab is dropped into a blank area of the desktop above the operating system—this creates a new graph stack panel with the current tab as the sole workspace. This removes the tab from the existing graph stack panel.

To delete a tab from the graph stack panel, the artist can perform any of the following actions:

Click on the "x" button on the right of the tab title to close the tab. There must be at least one workspace in the graph stack. The last tab can convert to a simple workspace title.

Right-click the tab and select "Close Tab" from the pop-up menu.

A right-click pop-up menu for a tab can be available. It should allow the artist to:

Save the tab as a bookmark.

Clone the current tab providing the artist with a new workspace based on the current graph stack tab.

Close the tab.

A right-click pop-up menu for the tab bar would be available in the blank area to the right of the right-most tab. It should allow the artist to:

Create a new tab.

Save a group of tabs as a single bookmark.

Clone the current set of tabs in a new graph stack panel.

Close all tabs and leave a blank workspace.

The panel header 1402 can include a control for type of indicator. The indicator mode is a pulldown menu which controls what indicator type is displayed on the nodes in the graph stack. Some example indicators that can be displayed are:

Notes—this indicates if a node has notes attached to it.

Cached—this indicates if the results of a node are currently held in the cache.

Expressions—this indicates if a node has expressions on any of it's attributes.

Dependents—this indicates if an expression is accessing data from this node

Dependencies—this indicates if a node has an expression which has dependencies on other nodes.

A history navigation button set can enable the artist to move backwards and forwards in the history of a given workspace with regards to what was expanded/collapsed/opened/closed. By clicking a left (back) or right (forward) buttons, the user can quickly return to an object which was previously closed. The history is stored independently for each workspace tab. The history does not get saved with the project.

The panel here includes a links drawer 1412, for example on the left side of the graph stack. A button to open and close the drawer is on the bottom left side of the panel, in the graph stack footer. The drawer can have a minimum size of 150 pixels. If the user hovers the cursor over the edge of the drawer, a splitter can appear that allows the artist to alter the size of the drawer.

The links drawer 1412 is where the user can save links to favorite containers, searches and groups, for example. It provides a quick way to access any container or function in a project and bring it directly into the current workspace. The links can be considered "Bookmarks for Objects", as opposed to the bookmarks in the bookmarks bar. One difference is that bookmarks in the bookmarks bar are specifically for workspaces, and they save the layout of a workspace, and the state and position of the nodes and containers visible in that workspace, when the bookmark is created. On the other hand, a link to a node saves only the object name. Clicking it will place the item into the currently visible workspace tab in window mode, whereas clicking on a bookmark will refresh the entire workspace.

The following are examples of interactions with links:

The artist can drag any node into the links drawer to add it to the list of links.

While a node is selected in the graph stack workspace, the artist can click the "+" sign at the bottom of the drawer to add a link to that node.

Once an item is in the links list, clicking on the link in the favorites category, will open the item in "window" mode in the front-most graph stack workspace.

The list ordering can be arranged by the artist. Dragging a link up or down inside of the panel will drag and drop the link into the new location without loading it into the front-most tab. Insertion point in the list will be shown while dragging.

Dragging the link from the places drawer into the graph stack will follow a particular ruleset based upon where the user drops the link. It will behave the same as dragging a node which already exists in the workspace. If the artist drops the link into another container, that moves the node represented by the link into the container where it is dropped. If the link is dropped into a blank space of the graph stack workspace, the node to which the link points is placed onto the workspace in "window" mode. The artist can open it, or navigate it's hierarchy. A right-click option can be provided on a link which would enable the artist to reveal the hierarchy of the placement of the link, and navigate to one of its parents.

The link can be deleted by right-clicking on the link and selecting "Delete Link" from the pop-up menu.

A collection of several nodes can be saved as a user defined group. In the links drawer 1412, they have an icon next to them indicating they are a group and not a single node.

The following are examples of interactions with a group:

To create a group, the artist selects multiple nodes in the graph stack and drags them to the drawer. A group is created by default.

Selecting the "+" pulldown at the bottom of the list view pops a menu allowing the artist to select "New Group". A new empty group is created.

The artist can drag items from the graph stack or from the project browser onto an existing group. They will be added to that group.

Still referring to FIG. 14A, the user can click on the group in the link table 1412 that corresponds to the group 1400. In response, a popup window shows the contents of the group. For example, the group 1400 is seen to include five containers. The popup window can disappear if the user clicks elsewhere than in the popup window. Clicking on another link will move the popup to show the contents of the other group. Arrow keys on the keyboard can drive the selection up and down; however the selection stops at a link to a node. This way, if an artist wishes to see the contents of different groups they can click a single group link and use the arrow keys to drive the selection up and down.

The popup window can be "torn off" to be a floating window and keep the group's contents visible. For example, in FIG. 14B the user has torn off the group 1400, such as by holding a mouse button while pointing to the group, and dragging the group away from its current location. Tearing causes a window to be generated, which persists in front of the interface. Selection of nodes in the window can occur similar to selecting that node in the graph stack, refreshing any attribute editor which is currently viewing objects which are selected. The floating window is linked to and is only viewing the contents of the group which spawned it. If the artist then clicks on another group in the links drawer, a new popup window is spawned and does not re-use the previously torn off window.

A group can be re-named by right-clicking on a group in the link drawer and selecting "Rename Group" from the popup menu. Nodes can be removed from the group by either clicking on their "Close" button, or by selecting the node in the group window and hitting "Delete" on the keyboard. The representations of the nodes in the window can all have a "Close" button.

A container cannot be opened in a floating window. Dragging from this window into the graph stack allows the artist to work with it as they would any other item in the graph stack in window mode. Double clicking a container will open the container in "window mode" in the front-most graph stack tab. There, the artist can interact with it as they normally would interact with a node in the graph stack workspace.

The artist can interact with all visible indicators and buttons on the node, with the exception of the disclosure toggle. This is to enable the artist quick access to disable nodes, or change their composite mode.

Figure 15:
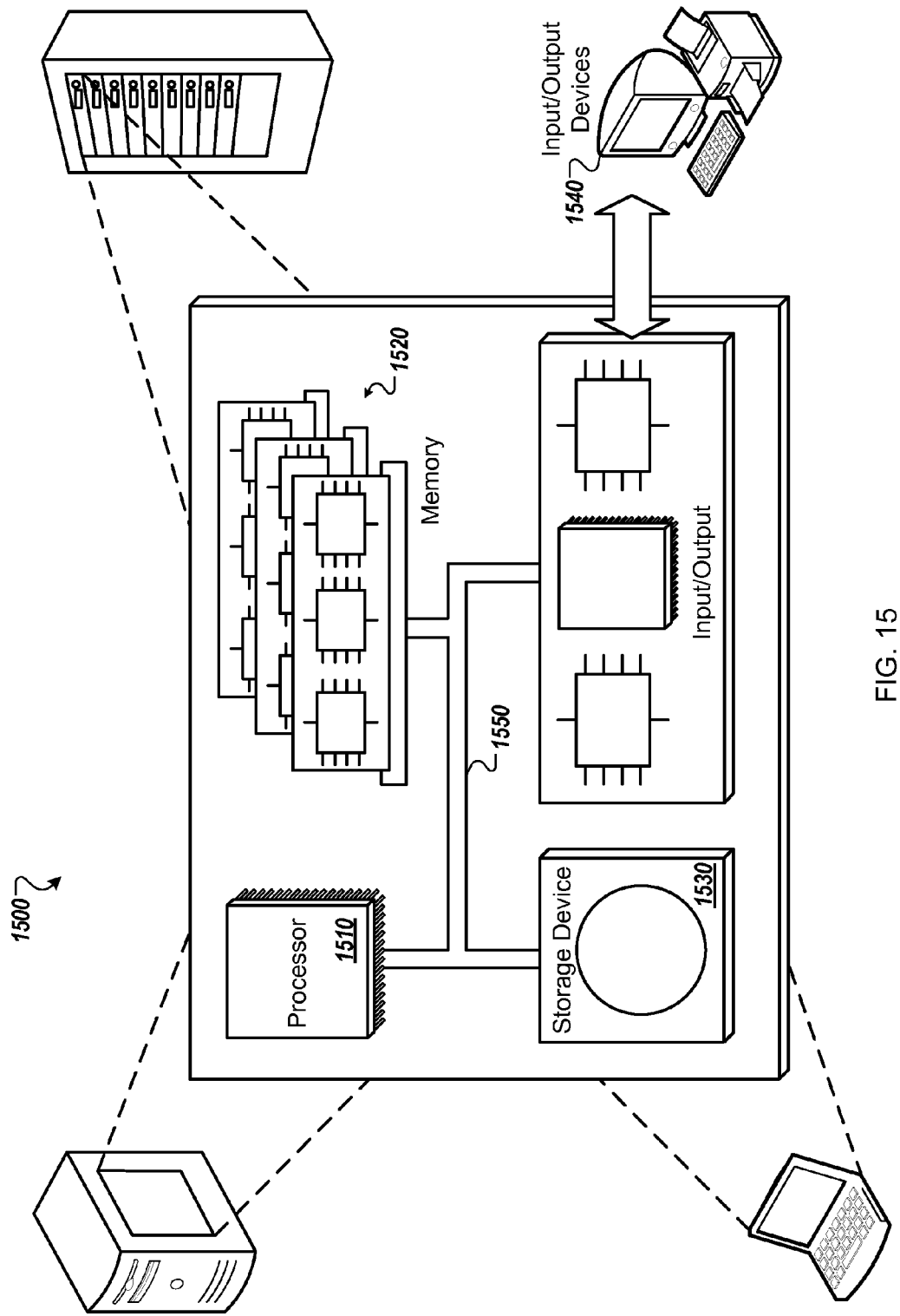
FIG. 15 is a block diagram of a computing system that can be used in connection with computer-implemented methods described in this document.

FIG. 15 is a schematic diagram of a generic computer system 1500. The system 1500 can be used for the operations described in association with any of the computer-implement methods described previously, according to one implementation. The system 1500 includes a processor 1510, a memory 1520, a storage device 1530, and an input/output device 1540. Each of the components 1510, 1520, 1530, and 1540 are interconnected using a system bus 1550. The processor 1510 is capable of processing instructions for execution within the system 1500. In one implementation, the processor 1510 is a single-threaded processor. In another implementation, the processor 1510 is a multi-threaded processor. The processor 1510 is capable of processing instructions stored in the memory 1520 or on the storage device 1530 to display graphical information for a user interface on the input/output device 1540.

The memory 1520 stores information within the system 1500. In some implementations, the memory 1520 is a computer-readable medium. The memory 1520 is a volatile memory unit in some implementations and is a non-volatile memory unit in other implementations.

The storage device 1530 is capable of providing mass storage for the system 1500. In one implementation, the storage device 1530 is a computer-readable medium. In various different implementations, the storage device 1530 may be a floppy disk device, a hard disk device, an optical disk device, or a tape device.

The input/output device 1540 provides input/output operations for the system 1500. In one implementation, the input/output device 1540 includes a keyboard and/or pointing device. In another implementation, the input/output device 1540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method for visually representing a composite graph for an image, the method comprising:
   providing, in a computer system, a visual representation of a composite graph for an image, the visual representation comprising a top-level graphical container, the top-level graphical container comprising:
   first items representing:
   visual elements of the image; and
   graphical containers for image functions; and
   second items representing the image functions, wherein:
   each of the second items is visually encapsulated within at least one of the graphical containers;
   the first items and second items are presented in the top-level graphical container in a visual stack that represents a compositing order for the elements of the image and the image functions;
   at least one of the graphical containers includes a mask icon indicating that a mask is applied to the contents of the at least one graphical container; and
   each image function affects elements of the image ordered below the image function in the visual stack;

receiving, in the computer system, a first input selecting an expansion mode for presenting contents of a first graphical container, each of the graphical containers having:
- a first expansion mode, wherein the contents are displayed generally adjacent to and outside of the top-level graphical container with a visual connection to an original location in the top-level graphical container; and
- a second expansion mode, wherein the contents are displayed generally within the top-level graphical container;

providing, in the computer system, a first modified visual representation of the composite graph in response to the first input, wherein the first modified visual representation maintains the order of the image functions defined by the composite graph and has the first graphical container expanded according to the selected expansion mode, wherein upon receipt of a second input, the selected expansion mode for presenting contents of the first graphical container is modified to a previously unselected expansion mode and a corresponding second modified visual representation of the composite graph is provided;

receiving a third input that requests a first view and a second view of the visual representation, wherein:
- the first view comprises graphical containers from a first portion of the visual representation; and
- the second view comprises graphical containers from a second portion of the visual representation, the second portion being from a topologically separate area of the visual representation than the first portion, the second view being provided by tearing off the graphical containers from the second portion of the visual representation and relocating them adjacent to the graphical containers of the first view; and generating a third modified visual representation of the composite graph in response to the third input, the third modified visual representation providing at least the two views, wherein the third modified visual representation maintains an order of image functions in the graphical containers of the first and second views.

2. The computer-implemented method of claim 1, wherein the first modified visual representation further includes, simultaneously with the first graphical container that is expanded according to the selected expansion mode, a second graphical container expanded using another expansion mode of the graphical containers than the selected expansion mode.

3. The computer-implemented method of claim 2, wherein the first graphical container is expanded using the first expansion mode and has included therein the second graphical container which is expanded using the second expansion mode.

4. The computer-implemented method of claim 1, wherein the first expansion mode includes:
presenting the first graphical container and at least one other first or second item organized in a generally vertical list in the visual representation, wherein
the expanded first graphical container is horizontally offset to a location on one side of the vertical list and visually connected to the first graphical container in the vertical list, and the expanded first graphical container includes at least one first or second item visible at the location.

5. The computer-implemented method of claim 1, wherein the second expansion mode includes:
presenting the first graphical container and at least one other first or second item organized in a generally vertical list in the visual representation, wherein the expanded first graphical container is included in the vertical list starting where the first graphical container is located, and the other first or second item is displaced vertically in the vertical list to accommodate the expanded first graphical container, and the expanded first graphical container includes at least one first or second item visible in the vertical list.

6. The computer-implemented method of claim 1, further comprising:
receiving a user modification of a graphical container in at least one of the views while the third modified visual representation is displayed; and
modifying the composite graph according to the user modification.

7. The computer-implemented method of claim 1, wherein a user creates the composite graph by choosing the order and assembling the graphical containers so that the composite graph reflects the order, the assembly being done by making one or more inputs in the computer system causing each of the graphical containers to be placed in respective selected locations.

8. A computer program product embodied in a non-transitory computer-readable storage medium and comprising instructions that when executed by one or more processors cause the one or more processors to perform operations comprising:
providing, in a computer system, a visual representation of a composite graph for an image, the visual representation comprising a top-level graphical container, the top-level graphical container comprising:
first items representing:
- visual elements of the image; and
- graphical containers for image functions; and second items representing the image functions, wherein:
- each of the second items is visually encapsulated within at least one of the graphical containers;
- the first items and second items are presented in the top-level graphical container in a visual stack that represents a compositing order for the elements of the image and the image functions;
- at least one of the graphical containers includes a mask icon indicating that a mask is applied to the contents of the at least one graphical container; and
- each image function affects elements of the image ordered below the image function in the visual stack;

receiving, in the computer system, a first input selecting an expansion mode for presenting contents of a first graphical container, each of the graphical containers having:
- a first expansion mode, wherein the contents are displayed generally adjacent to and outside of the top-level graphical container with a visual connection to an original location in the top-level graphical container; and
- a second expansion mode, wherein the contents are displayed generally within the top-level graphical container;

providing, in the computer system, a first modified visual representation of the composite graph in response to the first input, wherein the first modified visual representation maintains the order of the image functions defined by the composite graph and has the first graphical container expanded according to the selected expansion mode, wherein upon receipt of a second input, the selected expansion mode for presenting contents of the first graphical container is modified to a previously unselected expansion mode and a corresponding second modified visual representation of the composite graph is provided;

receiving a third input that requests a first view and a second view of the visual representation, wherein:
the first view comprises graphical containers from a first portion of the visual representation; and
the second view comprises graphical containers from a second portion of the visual representation, the second portion being from a topologically separate area of the visual representation than the first portion, the second view being provided by tearing off the graphical containers from the second portion of the visual representation and relocating them adjacent to the graphical containers of the first view; and generating a third modified visual representation of the composite graph in response to the third input, the third modified visual representation providing at least the two views, wherein the third modified visual representation maintains an order of image functions in the graphical containers of the first and second views.

9. The computer program product of claim 8, wherein the first modified visual representation further includes, simultaneously with the first graphical container that is expanded according to the selected expansion mode, a second graphical container expanded using another expansion mode of the graphical containers than the selected expansion mode.

10. The computer program product of claim 9, wherein the first graphical container is expanded using the first expansion mode and has included therein the second graphical container which is expanded using the second expansion mode.

11. A computer system comprising:
an image processing module tangibly embodied in a computer-readable storage medium, the image processing module configured to render an image by performing image functions in an order defined by a composite graph for the image;
a graph management module tangibly embodied in a computer-readable storage medium, the graph management module configured for: (i) a user to generate the composite graph, and for (ii) generating a visual representation of the composite graph, the visual representation comprising a top-level graphical container, the top-level graphical container comprising:
first items representing:
visual elements of the image; and
graphical containers for the image functions, wherein each of the graphical containers has:
a first expansion mode, wherein the contents are displayed generally adjacent to and outside of the top-level graphical container with a visual connection to an original location in the top-level graphical container; and
a second expansion mode, wherein the contents are displayed generally within the top-level graphical container; and
second items representing the image functions, wherein:
each of the second items is visually encapsulated within at least one of the graphical containers;
the first items and second items are presented in the top-level graphical container in a visual stack that represents a compositing order for each of the elements of the image and image functions;
at least one of the graphical containers includes a mask icon indicating that a mask is applied to the contents of the at least one graphical container; and
each image function affects elements of the image ordered below the image function in the visual stack; and a display device for presenting the visual representation that presents:
after receiving a first input selecting one of the first and second expansion modes for presenting contents of a first graphical container, a first modified visual representation of the composite graph in response to the first input, the first modified visual representation maintaining the order of the image functions defined by the composite graph and having the first graphical container expanded according to the selected expansion mode, wherein upon receipt of a second input, the selected expansion mode for presenting contents of the first graphical container is modified to a previously unselected expansion mode and a corresponding second modified visual representation of the composite graph is provided; and
after receiving a third input that requests a first view and a second view of the visual representation, a third modified visual representation of the composite graph providing at least two views, wherein:
the first view comprises graphical containers from a first portion of the visual representation;
the second view comprises graphical containers from a second portion of the visual representation, the second portion being from a topologically separate area of the visual representation than the first portion, the second view being provided by tearing off the graphical containers from the second portion of the visual representation and relocating them adjacent to the graphical containers of the first view; and
the third modified visual representation maintains an order of image functions in the graphical containers of the first and second views.

12. The computer system product of claim 11, wherein the graphical user interface further comprises an input function to cause each of the graphical containers to be placed in a selected location so that the composite graph reflects the order.

13. The computer system product of claim 12, wherein the input function comprises at least one of: (i) a drag-and-drop function, the assembly being done by dragging each of the graphical containers and dropping the dragged graphical container in the selected location; and (ii) a keyboard shortcut.

14. A computer program product embodied in a non-transitory computer-readable storage medium, the computer program product including instructions that, when executed, generate on a display device a graphical user interface for visually representing a composite graph for an image, the graphical user interface comprising:
a visual representation of the composite graph for the image, the visual representation comprising a top-level graphical container;
first items included in the top-level graphical container, the first items representing:
visual elements of the image; and
graphical containers for image functions, wherein each of the graphical containers has:
a first expansion mode, wherein the contents are displayed generally adjacent to and outside of the top-level graphical container with a visual connection to an original location in the top-level graphical container; and a second expansion mode, wherein the contents are displayed generally within the top-level graphical container; and second items included in the top-level graphical container, the second items representing the image functions, wherein:

each of the second items is visually encapsulated within at least one of the graphical containers;

the first items and second items are presented in the top-level graphical container in a visual stack that represents a compositing order for each of the elements of the image and image functions; and each image function affects elements of the image ordered below the image function in the visual stack;

wherein, after receiving a first input selecting one of the first and second expansion modes for presenting contents of a first graphical container, the graphical user interface generates a first modified visual representation of the composite graph in response to the input, the first modified visual representation maintaining the order of the image functions defined by the composite graph and having the first graphical container expanded according to the selected expansion mode, and upon receipt of a second input, the selected expansion mode for presenting contents of the first graphical container is modified to a previously unselected expansion mode and a corresponding second modified visual representation of the composite graph is provided; and wherein after receiving a third input that requests a first view and a second view of the visual representation, the graphical user interface generates a third modified visual representation of the composite graph providing at least two views, wherein:

the first view comprises graphical containers from a first portion of the visual representation;

the second view comprises graphical containers from a second portion of the visual representation, the second portion being from a topologically separate area of the visual representation than the first portion, the second view being provided by tearing off the graphical containers from the second portion of the visual representation and relocating them adjacent to the graphical containers of the first view; and the third modified visual representation maintains an order of image functions in the graphical containers of the first and second views.

15. The computer program product of claim 14, wherein the graphical user interface further comprises an input function to cause each of the graphical containers to be placed in a selected location so that the composite graph reflects the order.

16. The computer program product of claim 15, wherein the input function comprises at least one of: (i) a drag-and-drop function, the assembly being done by dragging each of the graphical containers and dropping the dragged graphical container in the selected location; and (ii) a keyboard shortcut.

17. The computer program product of claim 14, wherein the graphical user interface further comprises:

a project panel that lists each composite that is involved in a project, including the composite graph, and provides access to sources for the project.

18. The computer program product of claim 14, wherein the graphical user interface further comprises:

a composite map panel providing a single location for cross referencing multiple types of data, overlaid on a map of a structure of the composite graph.

19. The computer program product of claim 14, wherein the graphical user interface further comprises:

a timeline panel providing access to timing parameters for nodes and objects in the composite graph.

20. The computer program product of claim 14, wherein the graphical user interface further comprises:

an asset panel providing access to a pipeline for bringing rendered images and elements into a project that includes the composite graph.

* * * * *